(12) United States Patent
Huang et al.

(10) Patent No.: US 11,388,716 B2
(45) Date of Patent: Jul. 12, 2022

(54) POWER HEADROOM REPORT FOR LTE-NR CO-EXISTENCE

(71) Applicant: QUALCOMM Incorporated, San Diego, CA (US)

(72) Inventors: Yi Huang, San Diego, CA (US); Wanshi Chen, San Diego, CA (US); Seyedkianoush Hosseini, San Diego, CA (US); Peter Gaal, San Diego, CA (US); Renqiu Wang, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/010,572

(22) Filed: Sep. 2, 2020

(65) Prior Publication Data

US 2020/0404657 A1 Dec. 24, 2020

Related U.S. Application Data

(63) Continuation of application No. 16/047,764, filed on Jul. 27, 2018, now abandoned.
(Continued)

(51) Int. Cl.
*H04W 72/04* (2009.01)
*H04W 52/36* (2009.01)
(Continued)

(52) U.S. Cl.
CPC ....... *H04W 72/0446* (2013.01); *H04W 24/10* (2013.01); *H04W 52/325* (2013.01);
(Continued)

(58) Field of Classification Search
CPC . H04W 24/10; H04W 52/325; H04W 52/365; H04W 52/367; H04W 72/0446;
(Continued)

(56) References Cited

U.S. PATENT DOCUMENTS 9,679,144 B2 6/2017 Molnar et al.
9,746,938 B2 8/2017 Gardner et al.
(Continued)

FOREIGN PATENT DOCUMENTS

WO WO-2012061582 A1 5/2012
WO 2017035464 A1 3/2017
WO 2018027540 A1 2/2018

OTHER PUBLICATIONS

Huawei et al., "Overall L2 Consideration on EN DC", 3GPP Draft, R2-1707407 Overall L2 Consideration on EN DC V01, 3rd Generation Partnership Project (3GPP), Mobile Competence Centre, 650, Route Lucioles, F-06921 Sophia-Antipolis Cedex, France vol. Ran WG2, No. Qingdao, China, Jun. 27, 2017-Jun. 29, 2017, Jun. 26, 2017 (Jun. 26, 2017), XP051301896, pp. 1-3, Retrieved from the Internet: URL:http://www.3gpp.org/ftp/Meetings_3GPP_SYNC/RAN2/Docs/ [retrieved on Jun. 26, 2017].
(Continued)

*Primary Examiner* — Robert J Lopata
(74) *Attorney, Agent, or Firm* — Holland & Hart LLP

(57) ABSTRACT

Methods, systems, and devices for wireless communication are described. Generally, the described techniques provide for a power headroom report for multiple radio access technologies (RATs). A user equipment (UE) may support multiple RATs that correspond to different transmission time intervals (TTIs). A UE may determine a reporting schedule for power headroom reports (PHRs) for a first RAT and a second schedule for PHRs for a second RAT. The UE may generate a PHR for the first RAT and a companion PHR for the second RAT, and may transmit the PHR and companion
(Continued)

PHR based at least in part on the first PHR schedule. In some examples, the UE may receive a PHR type from the base station, and may determine a joint PHR based on the type. The UE may determine a joint PHR schedule based on a granularity of supported RATs.

9 Claims, 22 Drawing Sheets

Related U.S. Application Data

(60) Provisional application No. 62/539,446, filed on Jul. 31, 2017.

(51) Int. Cl.
| | | |
|---|---|---|
| *H04W 52/32* | (2009.01) | |
| *H04W 24/10* | (2009.01) | |
| *H04W 72/12* | (2009.01) | |
| *H04W 88/06* | (2009.01) | |

(52) U.S. Cl.
CPC ....... *H04W 52/365* (2013.01); *H04W 72/048* (2013.01); *H04W 52/367* (2013.01); *H04W 72/1215* (2013.01); *H04W 88/06* (2013.01)

(58) Field of Classification Search
CPC ........... H04W 72/048; H04W 72/1215; H04W 88/06
USPC .......................................................... 370/336
See application file for complete search history.

(56) References Cited

U.S. PATENT DOCUMENTS

| | | | |
|---|---|---|---|
| 9,832,743 | B2 | 11/2017 | Lee et al. |
| 10,143,016 | B2 | 11/2018 | Marinier et al. |
| 2011/0158117 | A1* | 6/2011 | Ho .................. H04W 52/34 370/252 |
| 2012/0082046 | A1* | 4/2012 | Ho .................. H04W 52/34 370/252 |
| 2012/0299876 | A1 | 11/2012 | De Leon et al. |
| 2015/0195796 | A1* | 7/2015 | Sivanesan .......... H04W 52/146 370/329 |
| 2016/0119883 | A1 | 4/2016 | Lee et al. |
| 2016/0255594 | A1* | 9/2016 | Vajapeyam ......... H04W 52/346 455/522 |
| 2017/0337352 | A1 | 11/2017 | Williams |
| 2018/0146440 | A1* | 5/2018 | Hosseini ............. H04W 52/365 |
| 2018/0279339 | A1* | 9/2018 | Lohr .................... H04W 72/14 |
| 2018/0324715 | A1* | 11/2018 | Ryoo ................... H04L 5/0007 |
| 2019/0037560 | A1 | 1/2019 | Huang et al. |
| 2019/0037579 | A1* | 1/2019 | Yi ......................... H04W 72/12 |
| 2019/0174432 | A1* | 6/2019 | Wang .................. H04W 52/365 |
| 2019/0182682 | A1* | 6/2019 | Kim .................. H04W 74/0833 |
| 2019/0306874 | A1* | 10/2019 | Lohr .................... H04W 52/34 |

OTHER PUBLICATIONS

Intel Corporation: "On Dual Connectivity for NR", 3GPP Draft; R1-1710580, 3rd Generation Partnership Project (3GPP), Mobile Competence Centre; 650, Route Des Lucioles; F-06921 Sophia-Antipolis Cedex; France, vol. RAN WG1 , no. Qingdao, P.R. China; Jun. 27, 2017-Jun. 30, 2017 Jun. 26, 2017 (Jun. 26, 2017), XP051299787, 3 pages, Retrieved from the Internet: URL: http://www.3gpp.org/ftp/Meetings_3GPP_SYNC/RAN1/Docs/ [retrieved on Jun. 26, 2017].

Intel Corporation: "Power Sharing Mechanism for NR Dual Connectivity", 3GPP Draft; R1-1710585, 3rd Generation Partnership Project (3GPP), Mobile Competence Centre; 650, Route Des Lucioles; F-06921, Sophia-Antipolis Cedex; France, vol. RAN WG1, no. Qingdao, P.R. China; Jun. 27, 2017-Jun. 30, 2017, Jun. 17, 2017 (Jun. 17, 2017), XP051305155, 3 pages, Retrieved from the Internet: URL: http://www.3gpp.org/ftp/tsg_ran/WG1_RL1/TSGR1_AH/NR_AH_1706/Docs/ [retrieved on Jun. 17, 2017].

International Preliminary Report on Patentability—PCT/US2018/044358, The International Bureau of WIPO—Geneva, Switzerland, dated Feb. 13, 2020.

International Search Report and Written Opinion—PCT/US2018/044358—ISA/EPO—dated Jan. 30, 2019.

Maiti A., et al., "Preventing Shoulder Surfing Using Randomized Augmented Reality Keyboards", Mar. 13, 2017, 26 Pages.

Partial International Search Report—PCT/US2018/044358—ISA/EPO—dated Oct. 8, 2018.

Samsung: "NSA PHR for EN-DC", 3GPP Draft, R2-1707353 NR PHR for EN-DC, 3rd Generation Partnership Project (3GPP), Mobile Competence Centre, 650, Route Des Lucioles, F-06921 Sophia-Antipolis Cedex, France vol. RAN WG2, No. Qingdao, China, Jun. 27, 2017-Jun. 29, 2017, Jun. 26, 2017 (Jun. 26, 2017), XP051301841, pp. 1-4, Retrieved from the Internet: URL:http://www.3gpp.org/ftp/Meetings_3GPP_SYNC/RAN2/Docs/ [retrieved on Jun. 26, 2017].

Taiwan Search Report—TW107126305—TIPO—dated Sep. 3, 2021.

* cited by examiner

POWER HEADROOM REPORT FOR LTE-NR CO-EXISTENCE

CLAIM OF PRIORITY

This application is a continuation of U.S. patent application Ser. No. 16/047,764 entitled "POWER HEADROOM REPORT FOR LTE-NR CO-EXISTENCE," filed Jul. 27, 2018, which claims priority to Provisional Patent Application No. 62/539,446 entitled "POWER HEADROOM REPORT FOR LTE-NR CO-EXISTENCE," filed Jul. 31, 2017, assigned to the assignee hereof and hereby expressly incorporated by reference herein.

BACKGROUND

The following relates generally to wireless communication, and more specifically to power headroom reporting for LTE-NR co-existence.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may communicate with a UE. While communicating with one or more UEs, the base station may determine whether to increase, decrease, or maintain a bandwidth allocated to a particular UE. The base station may utilize power headroom information to make this or other determinations. In some examples, a UE may transmit a power headroom report (PHR) to the base station. In some cases, one or more UEs in a wireless communications system may support more than one radio access technology (RAT). Different RATs may correspond to different transmission time interval (TTI) durations, and therefore may have different PHR reporting schedules.

SUMMARY

The described techniques relate to improved methods, systems, devices, or apparatuses that support power headroom reporting for long term evolution new radio (LTE-NR) co-existence. Generally, the described techniques provide for a power headroom report for multiple radio access technologies (RATs). In some examples, a user equipment (UE) may support connectivity via multiples RATs that operate using different transmission time interval (TTI) durations. In the examples described herein, a UE may send multiple power headroom reports (PHRs) or a joint PHR in accordance with a PHR reporting schedule determined based on the different TTI durations to enable a base station to improve allocation of resources for the multiple RATs.

In some examples, a UE may semi-statically split transmission power between multiple RATs. The UE may determine a first reporting schedule for a PHR for a first RAT and a second reporting schedule for a PHR for a second RAT. The UE may generate a PHR for the first RAT and a companion PHR (CPHR) for the second RAT, and may transmit the PHR and CPHR based on the first reporting schedule. The UE may thus report power headroom information for the second RAT based on the first reporting schedule for the first RAT, even though the second reporting schedule for the second RAT indicates that a PHR is not yet due. The UE may also generate a PHR for the second RAT and a CPHR for the first RAT, and may transmit the PHR for the second RAT and the CPHR based on the second PHR schedule. The UE may thus report power headroom information for the first RAT based on the second reporting schedule for the second RAT, even though the first reporting schedule for the first RAT indicates that a PHR is not yet due. Beneficially, the base station may be informed of power headroom information for each RAT whenever a UE is scheduled to send a PHR for any of the RATs, and the base station may use the increased reporting of power headroom information to improve allocation of resources for the multiple RATs.

In some examples, the UE may perform joint power management that dynamically divides transmission power between multiple RATs. The base station may inform the UE of a PHR type that indicates on which channels and/or RATs the UE is to calculate power headroom. The UE may calculate a power headroom value based on the PHR type, and transmit a joint PHR that includes the calculated power headroom value. In some examples, the UE may determine a schedule for sending the joint PHR to the base station based on a shortest TTI granularity of the supported RATs. Beneficially, the base station may be informed of joint power headroom information for the RATs based on how transmission power is currently being jointly managed for the multiple RATs, and the base station may use the joint power headroom information to improve allocation of resources for the multiple RATs.

A method of wireless communication by a UE in a system that supports a first RAT corresponding to a first TTI duration and a second RAT corresponding to a second TTI duration that is different than the first TTI duration is described. The method may include determining a first power headroom reporting schedule for the first RAT, and a second power headroom reporting schedule for the second RAT different from the first power headroom reporting schedule, generating a PHR for the first RAT and a companion PHR for the second RAT, and transmitting the PHR and the companion PHR based at least in part on the first power headroom reporting schedule.

An apparatus for wireless communication by a UE in a system that supports a first RAT corresponding to a first TTI duration and a second RAT corresponding to a second TTI duration that is different than the first TTI duration is described. The apparatus may include means for determining a first power headroom reporting schedule for the first RAT, and a second power headroom reporting schedule for the second RAT different from the first power headroom reporting schedule, means for generating a PHR for the first RAT and a companion PHR for the second RAT, and means for transmitting the PHR and the companion PHR based at least in part on the first power headroom reporting schedule.

Another apparatus for wireless communication by a UE in a system that supports a first RAT corresponding to a first TTI duration and a second RAT corresponding to a second TTI duration that is different than the first TTI duration is described. The apparatus may include a processor, memory in electronic communication with the processor, and instructions stored in the memory. The instructions may be operable to cause the processor to determine a first power headroom reporting schedule for the first RAT, and a second power headroom reporting schedule for the second RAT different from the first power headroom reporting schedule, generate a PHR for the first RAT and a companion PHR for the second RAT, and transmit the PHR and the companion PHR based at least in part on the first power headroom reporting schedule.

A non-transitory computer readable medium for wireless communication by a user equipment (UE) in a system that supports a first RAT corresponding to a first TTI duration and a second RAT corresponding to a second TTI duration that is different than the first TTI duration is described. The non-transitory computer-readable medium may include instructions operable to cause a processor to determine a first power headroom reporting schedule for the first RAT, and a second power headroom reporting schedule for the second RAT different from the first power headroom reporting schedule, generate a PHR for the first RAT and a companion PHR for the second RAT, and transmit the PHR and the companion PHR based at least in part on the first power headroom reporting schedule.

In some examples of the method, apparatus, and non-transitory computer-readable medium described above, a duration of a plurality of TTIs of the second RAT corresponds to a duration of a single TTI of the first RAT.

Some examples of the method, apparatus, and non-transitory computer-readable medium described above may further include processes, features, means, or instructions for determining that two or more of the plurality of TTIs each include a scheduled transmission.

Some examples of the method, apparatus, and non-transitory computer-readable medium described above may further include processes, features, means, or instructions for determining average power headroom for the two or more of the plurality of TTIs, wherein the companion PHR includes the average power headroom.

Some examples of the method, apparatus, and non-transitory computer-readable medium described above may further include processes, features, means, or instructions for identifying a reference TTI in the two or more of the plurality of TTIs. Some examples of the method, apparatus, and non-transitory computer-readable medium described above may further include processes, features, means, or instructions for determining power headroom for the reference TTI, wherein the companion PHR includes the power headroom for the reference TTI.

Some examples of the method, apparatus, and non-transitory computer-readable medium described above may further include processes, features, means, or instructions for determining power headroom for each of the plurality of TTIs, wherein the companion PHR includes the determined power headroom for the each of the plurality of TTIs.

Some examples of the method, apparatus, and non-transitory computer-readable medium described above may further include processes, features, means, or instructions for determining that a first TTI of the plurality of TTIs includes a scheduled transmission and that a second TTI of the plurality of TTIs does not include a scheduled transmission. Some examples of the method, apparatus, and non-transitory computer-readable medium described above may further include processes, features, means, or instructions for determining power headroom for the first TTI, wherein the companion PHR includes the determined power headroom for the first TTI.

Some examples of the method, apparatus, and non-transitory computer-readable medium described above may further include processes, features, means, or instructions for determining virtual power headroom for the second TTI, wherein the companion PHR includes a virtual power headroom for the second TTI. In some examples of the method, apparatus, and non-transitory computer-readable medium described above, determining the virtual power headroom for the second TTI may include determining the virtual power headroom for the second TTI based on a number of resource blocks.

In some examples of the method, apparatus, and non-transitory computer-readable medium described above, generating the PHR comprises: determining power headroom as a function of a maximum transmission power of the UE and an estimated transmission power, wherein the estimated transmission power may be a function of scheduled transmission power in a control channel of the first RAT, or a shared channel of the first RAT, or any combination thereof.

In some examples of the method, apparatus, and non-transitory computer-readable medium described above, generating the companion PHR comprises: determining power headroom as a function of a maximum transmission power of the UE and an estimated transmission power, wherein the estimated transmission power may be a function of scheduled transmission power in a control channel of the second RAT, or a shared channel of the second RAT, or any combination thereof.

Some examples of the method, apparatus, and non-transitory computer-readable medium described above may further include processes, features, means, or instructions for generating a PHR for the second RAT and a companion PHR for the first RAT. Some examples of the method, apparatus, and non-transitory computer-readable medium described above may further include processes, features, means, or instructions for transmitting the PHR for the second RAT and the companion PHR for the first RAT based at least in part on the second power headroom reporting schedule.

In some examples of the method, apparatus, and non-transitory computer-readable medium described above, the first RAT and the second RAT communicate using different numerology.

In some examples of the method, apparatus, and non-transitory computer-readable medium described above, at least one of the PHR or the companion PHR may be a virtual PHR.

In some examples of the method, apparatus, and non-transitory computer-readable medium described above, at least one of the PHR or the companion PHR includes a maximum transmission power of the UE.

In some examples of the method, apparatus, and non-transitory computer-readable medium described above, the PHR for the first RAT and the companion PHR for the second RAT may be configured based at least in part on a semi-static power split between the first RAT and the second RAT.

A method of wireless communication by a UE in a system that supports a first RAT corresponding to a first TTI duration and a second RAT corresponding to a second TTI duration that is different than the first TTI duration is described. The method may include receiving a signal specifying a PHR type, the PHR type associated with at least one channel of the first RAT and at least one channel of the second RAT, generating a joint PHR for the at least one channel of the first RAT and the at least one channel of the second RAT according to the PHR type, and transmitting the joint PHR.

An apparatus for wireless communication by a UE in a system that supports a first RAT corresponding to a first TTI duration and a second RAT corresponding to a second TTI duration that is different than the first TTI duration is described. The apparatus may include means for receiving a signal specifying a PHR type, the PHR type associated with at least one channel of the first RAT and at least one channel of the second RAT, means for generating a joint PHR for the at least one channel of the first RAT and the at least one channel of the second RAT according to the PHR type, and means for transmitting the joint PHR.

Another apparatus for wireless communication by a UE in a system that supports a first RAT corresponding to a first TTI duration and a second RAT corresponding to a second TTI duration that is different than the first TTI duration is described. The apparatus may include a processor, memory in electronic communication with the processor, and instructions stored in the memory. The instructions may be operable to cause the processor to receive a signal specifying a PHR type, the PHR type associated with at least one channel of the first RAT and at least one channel of the second RAT, generate a joint PHR for the at least one channel of the first RAT and the at least one channel of the second RAT according to the PHR type, and transmit the joint PHR.

A non-transitory computer readable medium for wireless communication by a UE in a system that supports a first RAT corresponding to a first TTI duration and a second RAT corresponding to a second TTI duration that is different than the first TTI duration is described. The non-transitory computer-readable medium may include instructions operable to cause a processor to receive a signal specifying a PHR type, the PHR type associated with at least one channel of the first RAT and at least one channel of the second RAT, generate a joint PHR for the at least one channel of the first RAT and the at least one channel of the second RAT according to the PHR type, and transmit the joint PHR.

Some examples of the method, apparatus, and non-transitory computer-readable medium described above may further include processes, features, means, or instructions for determining a PHR reporting timeline corresponding to a shorter of the first TTI duration and the second TTI duration, wherein transmitting the joint PHR may be based at least in part on the determined PHR reporting timeline.

In some examples of the method, apparatus, and non-transitory computer-readable medium described above, generating the joint PHR further comprises: determining power headroom as a function of a maximum transmission power of the UE and an estimated transmission power, wherein the estimated transmission power may be a function of scheduled transmission power in a control channel of the first RAT, or a shortened TTI of the first RAT, or a control channel of the second RAT, or a shared channel of the first RAT, or a shared channel of the second RAT, or any combination thereof.

In some examples of the method, apparatus, and non-transitory computer-readable medium described above, the first RAT and the second RAT communicate using different numerology.

In some examples of the method, apparatus, and non-transitory computer-readable medium described above, the joint PHR includes a maximum transmission power of the UE.

In some examples of the method, apparatus, and non-transitory computer-readable medium described above, the first TTI duration or the second TTI duration corresponds to a duration of a short TTI (sTTI) or a mini-slot.

A method of wireless communication by a base station in a system that supports a first RAT corresponding to a first TTI duration and a second RAT corresponding to a second TTI duration that is different than the first TTI duration is described. The method may include configuring a UE with a first power headroom reporting schedule for the first RAT and a second power headroom reporting schedule for the second RAT, receiving a PHR for the first RAT and a companion PHR for the second RAT based at least in part on the first power headroom reporting schedule, and allocating resources to the UE based at least in part on the PHR for the first RAT and the companion PHR for the second RAT.

An apparatus for wireless communication by a base station in a system that supports a first RAT corresponding to a first TTI duration and a second RAT corresponding to a second TTI duration that is different than the first TTI duration is described. The apparatus may include means for configuring a UE with a first power headroom reporting schedule for the first RAT and a second power headroom reporting schedule for the second RAT, means for receiving a PHR for the first RAT and a companion PHR for the second RAT based at least in part on the first power headroom reporting schedule, and means for allocating resources to the UE based at least in part on the PHR for the first RAT and the companion PHR for the second RAT.

Another apparatus for wireless communication by a base station in a system that supports a first RAT corresponding to a first TTI duration and a second RAT corresponding to a second TTI duration that is different than the first TTI duration is described. The apparatus may include a processor, memory in electronic communication with the processor, and instructions stored in the memory. The instructions may be operable to cause the processor to configure a UE with a first power headroom reporting schedule for the first RAT and a second power headroom reporting schedule for the second RAT, receive a PHR for the first RAT and a companion PHR for the second RAT based at least in part on the first power headroom reporting schedule, and allocate resources to a UE based at least in part on the PHR for the first RAT and the companion PHR for the second RAT.

A non-transitory computer readable medium for wireless communication by a base station in a system that supports a first RAT corresponding to a first TTI duration and a second RAT corresponding to a second TTI duration that is different than the first TTI duration is described. The non-transitory computer-readable medium may include instructions operable to cause a processor to configure a UE with a first power headroom reporting schedule for the first RAT and a second power headroom reporting schedule for the second RAT, receive a PHR for the first RAT and a companion PHR for the second RAT based at least in part on the first power headroom reporting schedule, and allocate resources to a UE based at least in part on the PHR for the first RAT and the companion PHR for the second RAT.

Some examples of the method, apparatus, and non-transitory computer-readable medium described above may further include processes, features, means, or instructions for adjusting a bandwidth allocation based at least in part on the PHR for the first RAT and the companion PHR for the second RAT.

Some examples of the method, apparatus, and non-transitory computer-readable medium described above may further include processes, features, means, or instructions for receiving a PHR for the second RAT and a companion PHR for the first RAT based at least in part on the second power headroom reporting schedule. Some examples of the method, apparatus, and non-transitory computer-readable medium described above may further include processes, features, means, or instructions for determining whether to adjust the allocated resources based at least in part on the PHR for the second RAT and the companion PHR for the first RAT.

A method of wireless communication by a base station in a system that supports a first RAT corresponding to a first TTI duration and a second RAT corresponding to a second TTI duration that is different than the first TTI duration is described. The method may include transmitting a message specifying a PHR type corresponding to at least one channel of the first RAT and at least one channel of the second RAT, receiving a joint PHR based at least in part on the PHR type, and allocating resources to a UE based at least in part on the joint PHR.

An apparatus for wireless communication by a base station in a system that supports a first RAT corresponding to a first TTI duration and a second RAT corresponding to a second TTI duration that is different than the first TTI duration is described. The apparatus may include means for transmitting a message specifying a PHR type corresponding to at least one channel of the first RAT and at least one channel of the second RAT, means for receiving a joint PHR based at least in part on the PHR type, and means for allocating resources to a UE based at least in part on the joint PHR.

Another apparatus for wireless communication by a base station in a system that supports a first RAT corresponding to a first TTI duration and a second RAT corresponding to a second TTI duration that is different than the first TTI duration is described. The apparatus may include a processor, memory in electronic communication with the processor, and instructions stored in the memory. The instructions may be operable to cause the processor to transmit a message specifying a PHR type corresponding to at least one channel of the first RAT and at least one channel of the second RAT, receive a joint PHR based at least in part on the PHR type, and allocate resources to a UE based at least in part on the joint PHR.

A non-transitory computer readable medium for wireless communication by a base station in a system that supports a first RAT corresponding to a first TTI duration and a second RAT corresponding to a second TTI duration that is different than the first TTI duration is described. The non-transitory computer-readable medium may include instructions operable to cause a processor to transmit a message specifying a PHR type corresponding to at least one channel of the first RAT and at least one channel of the second RAT, receive a joint PHR based at least in part on the PHR type, and allocate resources to a UE based at least in part on the joint PHR.

Some examples of the method, apparatus, and non-transitory computer-readable medium described above may further include processes, features, means, or instructions for transmitting a second message specifying a second PHR type that differs from the PHR type. Some examples of the method, apparatus, and non-transitory computer-readable medium described above may further include processes, features, means, or instructions for receiving a second joint PHR based at least in part on the second PHR type. Some examples of the method, apparatus, and non-transitory computer-readable medium described above may further include processes, features, means, or instructions for determining whether to adjust the allocated resources based at least in part on the second joint PHR.

DETAILED DESCRIPTION

Figure 1:
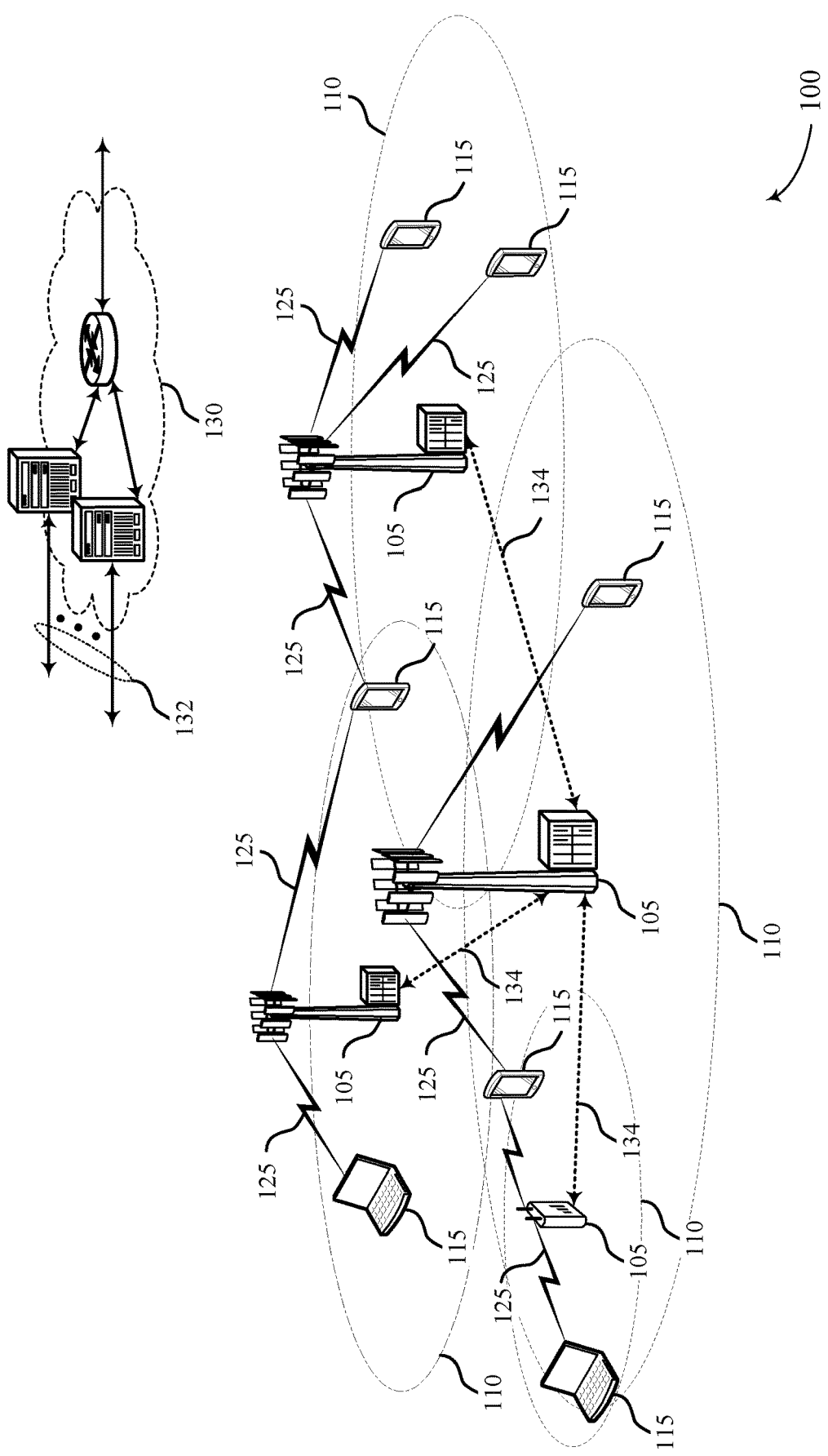
FIG. 1 illustrates an example of a system for wireless communication that supports power headroom report for Long Term Evolution New Radio (LTE-NR) co-existence in accordance with aspects of the present disclosure.

The described techniques support improved power headroom reporting for Long Term Evolution New Radio (LTE-NR) co-existence. In some examples, a user equipment (UE) may support connectivity via multiple radio access technologies (RATs) that operate using different transmission time intervals (TTIs). In the examples described herein, a UE may send multiple power headroom reports (PHRs) or a joint PHR in accordance with a reporting schedule determined based on the different TTI durations to enable a base station to improve allocation of resources for the multiple RATs. In an example, the multiple PHRs may include a PHR and a companion PHR that may be sent in accordance with the PHR reporting schedules of the RATs. In an example, the joint PHR may report power headroom information for specific channels and/or RATs as indicated in a PHR type.

In some wireless communications systems, a base station may communicate with a UE. While communicating with one or more UEs, the base station may determine whether to increase, decrease, or maintain an amount of bandwidth allocated to a particular UE for communication. The base station may utilize power headroom information to make this or other determinations. In some examples, a base station may configure a UE with a schedule at which the UE is to provide a PHR to the base station. The PHR may include a calculation of a power headroom value for one or more channels. The UE may calculate a power headroom value as the difference between a maximum transmission power of the UE and a total estimated transmission power in the one or more channels. If the UE is not scheduled to transmit on a particular channel when scheduled to provide a PHR, the UE may calculate a virtual PHR. In some cases, a UE may support more than one RAT. In some cases, different RATs may correspond to different TTI durations and have different PHR reporting schedules.

In some examples, a UE that supports multi-RAT connectivity may semi-statically split transmission power between multiple RATs. The UE may generate a separate PHR for each RAT. For example, the UE may generate a PHR for a first RAT according to a reporting schedule for the first RAT. Because the UE supports multiple RATs, the UE may also generate a companion PHR for any other RAT (e.g., a second RAT and/or additional RAT) that the UE also supports. The UE may send both the PHR and one or more companion PHRs to the base station corresponding to the reporting schedule for the first RAT. The UE may send the one or more companion PHRs even though a reporting schedule of the other RATs may not indicate that a PHR is due. The UE may also generate a PHR for the second RAT and a CPHR for the first RAT or any other RAT. The UE may transmit the PHR for the second RAT and the CPHR for the first RAT or any other RAT based on the second PHR schedule. Like above, the UE may send the one or more companion PHRs even though a reporting schedule of the first RAT or any other RAT may not indicate that a PHR is due. Beneficially, the UE more frequently provides the base station with a PHR for each RAT, and the base station may use the PHRs to efficiently allocate resources to the UE.

In some examples, a UE that supports multi-RAT connectivity may utilize joint power management that dynamically divides transmission power between multiple RATs. In some examples, the base station may inform the UE of a PHR type. A PHR type may specify that the UE is to calculate power headroom for a set of one or more channels of one or more RATs. The UE may calculate a power headroom value for the requested PHR type, and generate a joint PHR that includes the power headroom value. In some examples, the UE may determine a schedule for sending the PHR based on the periodicity of the RAT having the shortest TTI. Beneficially, the base station may be informed of joint power headroom information for the RATs based on how transmission power is currently being jointly managed for the multiple RATs, and the base station may use the joint power headroom information to improve allocation of resources for the multiple RATs.

Aspects of the disclosure are initially described in the context of a wireless communications system. Aspects of the disclosure are also described in the context of timing configuration diagrams, scheduling diagrams, and process flow diagrams. Aspects of the disclosure are further illustrated by and described with reference to apparatus diagrams, system diagrams, and flowcharts that relate to power headroom report for LTE-NR co-existence.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed LTE-U radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a multi-RAT connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Conventional systems may not be optimized to efficiently allocate resources for RATs that operate using different TTI durations.

In accordance with the techniques described herein, base station 105 may configure a UE 115 supporting multi-RAT connectivity with a PHR reporting schedule for each RAT. For a UE 115 that semi-statically splits transmission power between multiple RATs, the UE 115 may generate a PHR report for a first RAT based on a PHR schedule, and may also generate a companion PHR for a second RAT on which the UE 115 is not currently scheduled to send a PHR. UE 115 may transmit the PHR and the companion PHR to base station 105, which may determine subsequent resource allocation based on the received PHR and companion PHR. Base station 105 may utilize the PHR and the companion PHR in allocating resources for subsequent transmissions. In another example, UE 115 may utilize joint power management that dynamically divides transmission power between multiple RATs. The UE 115 may receive a PHR type from base station 105. The PHR type may specify channels and/or RATs on which the UE 115 is to report a power headroom (PH) value. UE 115 may calculate a PH value based on the indicated channels for each RAT, and may transmit a joint PHR that includes the calculated PH value. Base station 105 may utilize the received joint PHR in allocating resources for subsequent transmissions.

Figure 2:
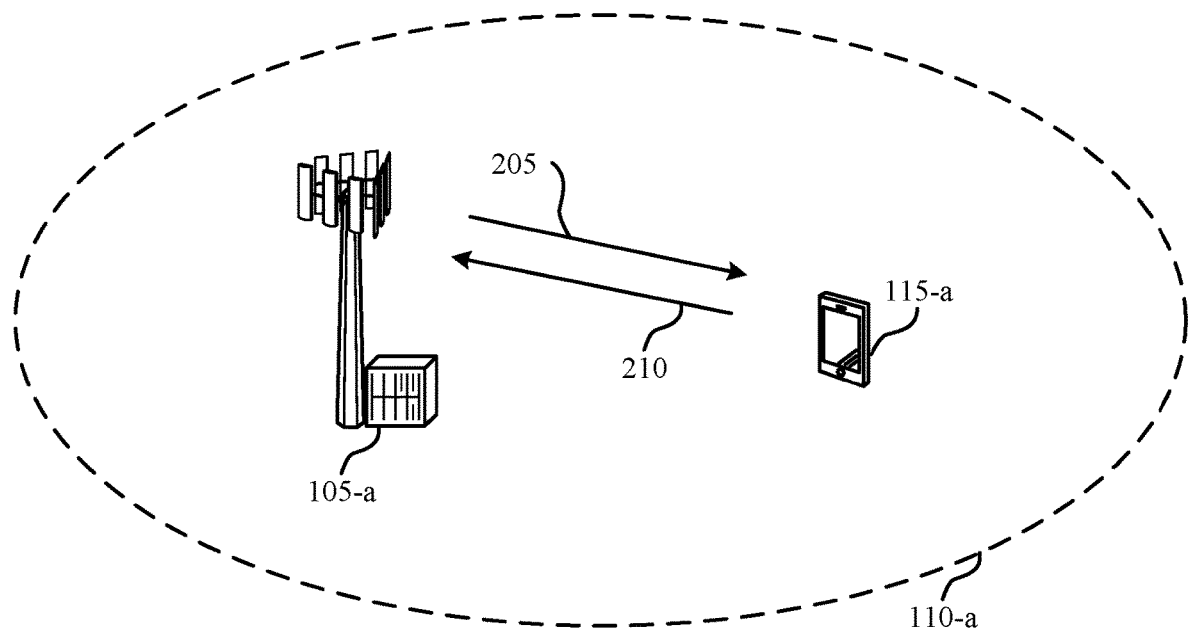
FIG. 2 illustrates an example of a wireless communications system that supports power headroom report for LTE-NR co-existence in accordance with aspects of the present disclosure.

FIG. 2 illustrates an example of a wireless communications system 200 that supports power headroom report for LTE-NR co-existence in accordance with various aspects of the present disclosure. In some examples, wireless communications system 200 may implement aspects of wireless communications system 100. Wireless communications system 200 may include a base station 105-a and a UE 115-a, which may be examples of the corresponding devices described with reference to FIG. 1.

In some examples, a base station 105-a may communicate with one or more UEs 115 within a geographic coverage area 110-a. For example, base station 105-a and UE 115-a may communicate with each other via downlink transmission 205 and uplink transmission 210. Base station 105-a may utilize a power headroom (PH) value received from a to determine how to allocate resources to the UE, such as UE 115-a. In some examples, base station 105-a may determine whether to increase or decrease an allocated bandwidth for UE 115-a based on a PH value received from UE 115-a.

Power headroom may be defined as an estimate of scheduled transmission power for one or more channels subtracted from a maximum available transmission power of UE 115-a. The estimated transmission power may be calculated based on a current modulation and coding scheme (MCS), current transmission channel, format of a message being communicated, number of resource blocks allocated for a transmission, or other metrics corresponding to UE 115-a. Base station 105-a may schedule power headroom reporting and/or identify requested PHR types to UE 115-a via one or more downlink transmissions 205. UE 115-a may respond with a PHR as requested or scheduled.

In some cases, wireless communications devices in wireless communications system 200 may support multi-RAT connectivity. In an example, UE 115-a may support a first RAT (e.g., LTE RAT) and a second RAT (e.g., NR RAT). Base station 105-a may request the UE 115-a provide a PHR for the first RAT and a PHR for the second RAT, so as to be able to allocate resources to the UE 115-a.

In some examples, uplink transmission power of UE 115-a may be semi-statically split between multiple RATs (e.g., LTE and NR). In an example, the UE 115-a may semi-statically divide its available transmission power between two or more RATs. For example, fifty percent of available transmission power may be allocated to an LTE RAT, and fifty percent of available transmission power may be allocated to a NR RAT. UE 115-a may semi-statically split power between more than one RAT in any percentage. Base station 105-a may send, via downlink transmission 205, a schedule for sending PHRs for a first RAT, and PHRs for a second RAT. For example, UE 115-a may generate and transmit a PHR for a first RAT in accordance with a first PHR schedule. UE 115-a may also generate a companion PHR (CPHR) for a second RAT in accordance with the first PHR schedule, even though a second PHR schedule of the second RAT does not indicate that the UE 115-a is due to send a PHR. UE 115-a may transmit a PHR and CPHR to base station 105-a via uplink transmission 210. The UE 115-a may similarly generate a PHR for the second RAT in accordance with the second PHR schedule, as well as a CPHR for the first RAT. These principles may be extended to any number of RATS. Base station 105-a may determine resource allocation based on received PHRs and CPHRs.

In some examples, UE 115-a may jointly manage uplink transmission power of multiple RATs. In joint power management, UE 115-a determine how much transmission power to allocate to each RAT for transmission in one or more channels at a particular time. Base station 105-a may schedule uplink transmissions for the UE 115-a, and the UE 115-a may periodically provide a joint PHR to indicate power headroom. Because the base station 105-a controls scheduling on one or more uplink channels, the base station 105-a may inform the UE 115-a of what types of channels to report a PH value. In an example, base station 105-a may transmit an indication to UE 115-a via downlink transmission 205. The indication may include a PHR type. The PHR type may specify which RATs and which channels the UE 115-a is to use for generating the joint PH value. UE 115-a may process the PHR type to identify the channels and RATs on which a PH value is to be calculated, and may generate a joint PHR that includes the PH value. UE 115-a may transmit the joint PHR to base station 105-c via uplink transmission 210, and base station 105-a may determine resource allocation based thereon.

Figure 3:
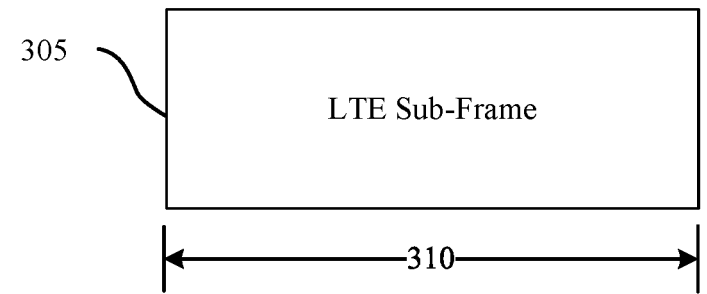
FIG. 3 illustrates an example of a timing configuration that supports power headroom report for LTE-NR co-existence in accordance with aspects of the present disclosure.
Figure 3:
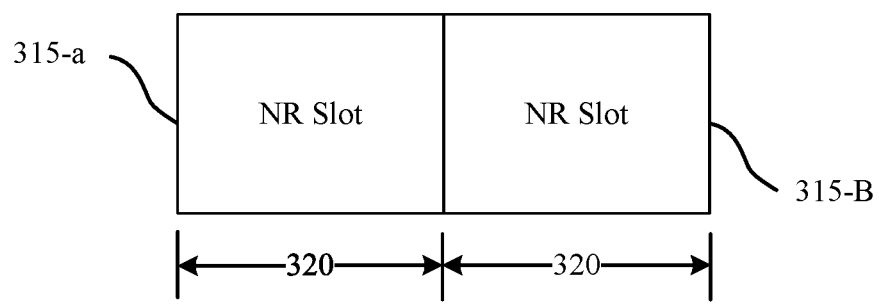

FIG. 3 illustrates an example of a timing configuration 300 that supports power headroom report for LTE-NR co-existence in accordance with various aspects of the present disclosure. In some examples, wireless communications system 100 and 200 may implement aspects of timing configuration 300 may implement. In some examples, different RATs may have different numerologies (e.g., different sub-carrier spacing, different TTI durations, etc.). For example, an LTE sub-frame 305 may have a first TTI duration 310 (e.g., 1 ms) and a NR slot may have a second TTI duration 320 (e.g., 0.5 ms. In the depicted example, a LTE sub-frame 305 has the same duration as two NR slots 315-a, 315-a.

In some examples, a base station 105 may transmit to a UE 115 a PHR schedule, and the PHR schedule may be different for each RAT supported by the UE 115. For instance, an LTE PH reporting schedule may indicate a periodicity at which the UE 115 is to provide a PHR for the LTE RAT. For example, the LTE PH reporting schedule may indicate that the UE 115-a is to send a PHR once per a defined numbers LTE sub-frames 305 (e.g., once per every 10 subframes). An NR PHR schedule may indicate a periodicity at which the UE 115 is to provide a PHR for the NR RAT. For example, the NR PHR schedule may indicate that the UE 115-a is to send a PHR once per a defined numbers NR slots 315. In some examples, a NR PH reporting schedule does not coincide with transmitted LTE PH reporting schedule. Moreover, different RATs may be scheduled to provide PHRs at different periodicities. Thus, at a point in time where a UE 115-a is only scheduled to transmit a PHR for a first RAT, base station 105-a may have stale PH information for a second RAT because a PHR corresponding to the second RAT is not due until some later point in time. To increase the likelihood that the base station 105-a has up to date PH values for each RAT, the UE 115-a may generate and send at least one companion PHR each time the UE is scheduled to send a PHR for a particular RAT.

Figure 4:
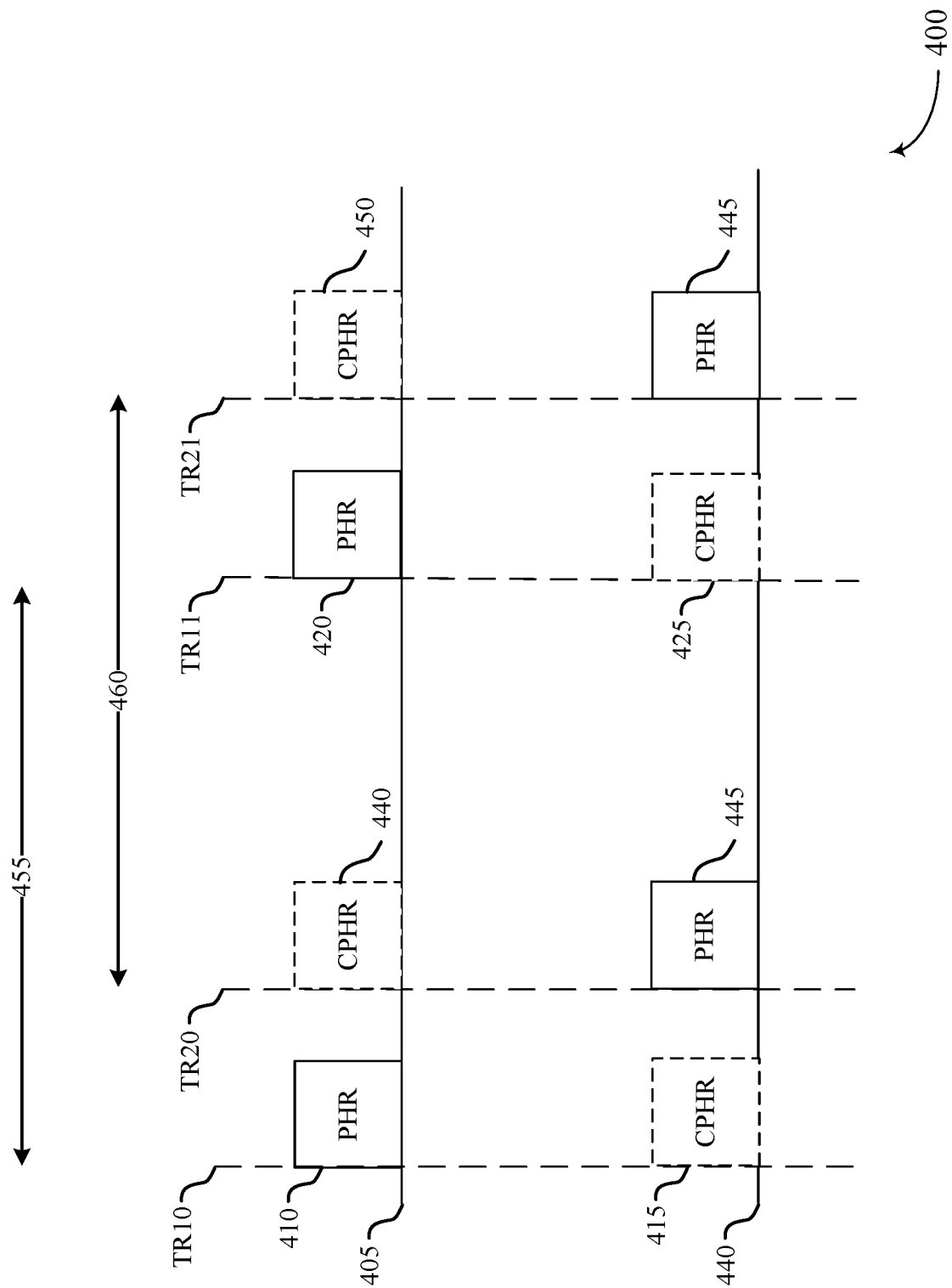
FIG. 4 illustrates an example of a power headroom report (PHR) schedule that supports power headroom report for LTE-NR co-existence in accordance with aspects of the present disclosure.

FIG. 4 illustrates an example of a timing diagram 400 that supports power headroom report for LTE-NR co-existence in accordance with various aspects of the present disclosure. In some examples, wireless communications system 100 may implement aspects of timing diagram 400. A base station 105 may configure the UE 115 with one or more PHR schedules indicating when the UE 115 is to send a PHR. A first timeline 405 may depict times when the UE 115 is scheduled to send PHRs for a first RAT R1 (e.g., LTE RAT). In the depicted example, PHR 410 and PHR 420 are scheduled to be sent at a first periodicity 455 corresponding to times TR10 and TR11. A second timeline 440 may depict times when the UE 115 is scheduled to send PHRs for a second RAT R2 (e.g., NR RAT). In the depicted example, PHR 445 may be scheduled at time TR20 and PHR 445 may be scheduled at time TR21. TR20 and TR21 may be offset by a second periodicity 460.

A scheduled LTE PHR (e.g., PHR 410) may not align with a scheduled NR PHR (e.g., PHR 445) because of the different TTI durations for the different RATs. In such cases, a UE 115 may generate a CPHR for the other RAT to send along with the scheduled PHR. The CPHR may be a PHR for the RAT that is not yet due to send a PHR. For example, a UE 115 may determine that an LTE PHR 410 is due at TR10, and that there is no scheduled NR PHR at TR10. The UE 115 may generate a CPHR 415 to transmit together with PHR 410. Base station 105 may receive PHR 410 and CPHR 415, and may utilize the PH values of each RAT to allocate resources for subsequent transmissions. Similarly, at TR20, UE 115 may determine that a NR PHR 445 is scheduled, but that there is no corresponding LTE PHR scheduled at the same time. Thus, UE 115 may generate an LTE CPHR 450.

A PHR (or a CPHR) may be based on a scheduled upcoming transmission in a particular TTI, or may be a virtual PHR generated for a TTI during which no uplink signal (e.g., PUCCH or PUSCH) is scheduled for transmission. A UE 115 may calculate a PH value for a hypothetical uplink transmission to generate the virtual PHR. The hypothetical transmission may have a particular format (e.g., hypothetical PUCCH and/or PUSCH format), use a particular number of resource blocks (e.g., one or more resource blocks), or the like.

A UE 115 may generate a PHR based on scheduled uplink transmissions that are performed during a given TTI, virtual transmissions corresponding to a given TTI, or both actual and virtual transmissions across one or more TTIs. For example, with reference to FIG. 3, a UE 115 may determine that an uplink transmission (e.g., PUSCH or PUCCH) is scheduled to be transmitted during LTE subframe 305, and that an uplink transmission is scheduled in each of NR slots

315-*a*, 315-*b*. UE 115 may calculate a PH value for the LTE subframe 305, and PH value for each of the NR slots 315-*a*, 315-*b*. Because the duration of a NR slot 315 is shorter than the duration of the LTE subframe 305, the UE 115 may calculate a PH value for each NR slot 315-*a*, 315-*b*, and optionally may combine the PH values. In an example, the UE 115-*a* may determine a value that is a function of the PH values for each of the NR slots 315-*a*, 315-*b*. The function may be an average or other statistic metric of the PH values calculated for each of the NR slots 315-*a*, 315-*b*. In another example, the function may be a maximum or minimum of the PH values calculated for the NR slots 315-*a*, 315-*b*. In this example, the UE 115 may be scheduled to send a PHR for the LTE RAT. The UE 115 may generate a PHR for the LTE RAT that includes the PH value calculated for the LTE subframe 305, and a CPHR for the NR RAT that is the function of the PH values for the NR slots 315-*a*, 315-*b*.

In some examples, the UE 115 may generate the CPHR that includes PH values for less than all of the TTIs. In an example, UE 115 may select, or the base station 105 may configure the UE 115 to select, one of the TTIs as a reference TTI. For example, one of NR slots 315-*a*, 315-*b* may be selected as a reference NR slot. For instance, UE 115 may select NR slot 315-*a* as the reference NR slot. UE 115 may calculate a PH value for the reference NR slot 315, and ignore the NR slot 315-*b* in the PH calculation. In this example, the CPHR for the NR RAT may include the PH value for the reference NR slot 315-*a*.

In some examples, the UE 115 may generate the CPHR using one or more TTIs that have a scheduled transmission. For example, UE 115 may determine that only one of NR slots 315-*a*, 315-*b* has a scheduled uplink transmission. For example, an uplink transmission may be scheduled in NR slot 315-*a*, but not in NR slot 315-*b*. UE 115 may calculate a PH value based on the scheduled uplink transmission in NR slot 315-*a*, and may skip calculating a power headroom value for NR slot 315-*b*.

In some examples, the UE 115 may generate the CPHR for all NR slots regardless of whether each has a scheduled transmission. In an example, UE 115 may calculate a PH value based on the scheduled uplink transmission of NR slot 315-*a*, and may calculate a virtual PH value based on hypothetical uplink transmission in NR slot 315-*b*. UE 115 may determine a value that is a function of the PH value for each of the NR slots 315-*a*, 315-*b* (e.g., average the actual and virtual PHRs, a maximum PH value, a minimum PH value). In some examples, the CPHR may include multiple PH values that may be calculated on scheduled transmissions and/or using hypothetical transmissions.

In some examples, UE 115 may determine that no uplink transmission is scheduled in any of multiple TTIs. In such examples, UE 115 may calculate virtual PH value for some or all of the TTIs. In an example, UE 115 may determine a value that is a function of the PH value for each of the NR slots 315-*a*, 315-*b* (e.g., an average of the two virtual PHRs, a maximum PH value, a minimum PH value). UE 115 may generate a CPHR that includes the value that is a function of the PH value for each of the NR slots, may include two or more virtual PH values, or any combination thereof.

For each time at which a PHR is scheduled for a particular RAT, a CPHR for the other RAT may be generated based on scheduled or hypothetical uplink transmissions in the one or more RATs. The UE 115 may transmit the PHR and one or more CPHRs together to a base station 105, as depicted in FIG. 4. In some examples, more than two RATs may be supported, or multiple TTIs may be supported within the same RAT (e.g., sTTIs and TTIs corresponding to LTE transmissions). In any such case, UE 115 may determine a PH value for each RAT and/or TTI duration based on scheduled or hypothetical transmissions. The UE 115 may transmit a CPHR that includes the PH values when transmitting a scheduled PHR for a RAT. In some examples, the PHR and/or CPHR may include a maximum available transmission power of the UE 115, such that base station 105 may be aware of UE 115 capabilities.

Base station 105 may receive the PHR and the CPHR, and may determine a resource allocation for the UE 115 based thereon. Base station 105 may transmit a resource grant to UE 115, optionally adjusting the resource allocation (e.g., bandwidth) for subsequent transmissions. For example, if UE 115 reports a high PH value (e.g., the maximum transmission power is somewhat to significantly higher than the estimated scheduled transmission power), then base station 105 may has the option to allocate more resources (e.g., additional bandwidth) to UE 115 for subsequent transmissions. If UE 115 reports a low PH value (e.g., the maximum transmission power is slightly more than the estimated desired bandwidth), then base station 105 may decrease allocated resources to UE 115 for subsequent transmissions. UE 115 may send uplink transmissions using the allocated resources.

Figure 5:
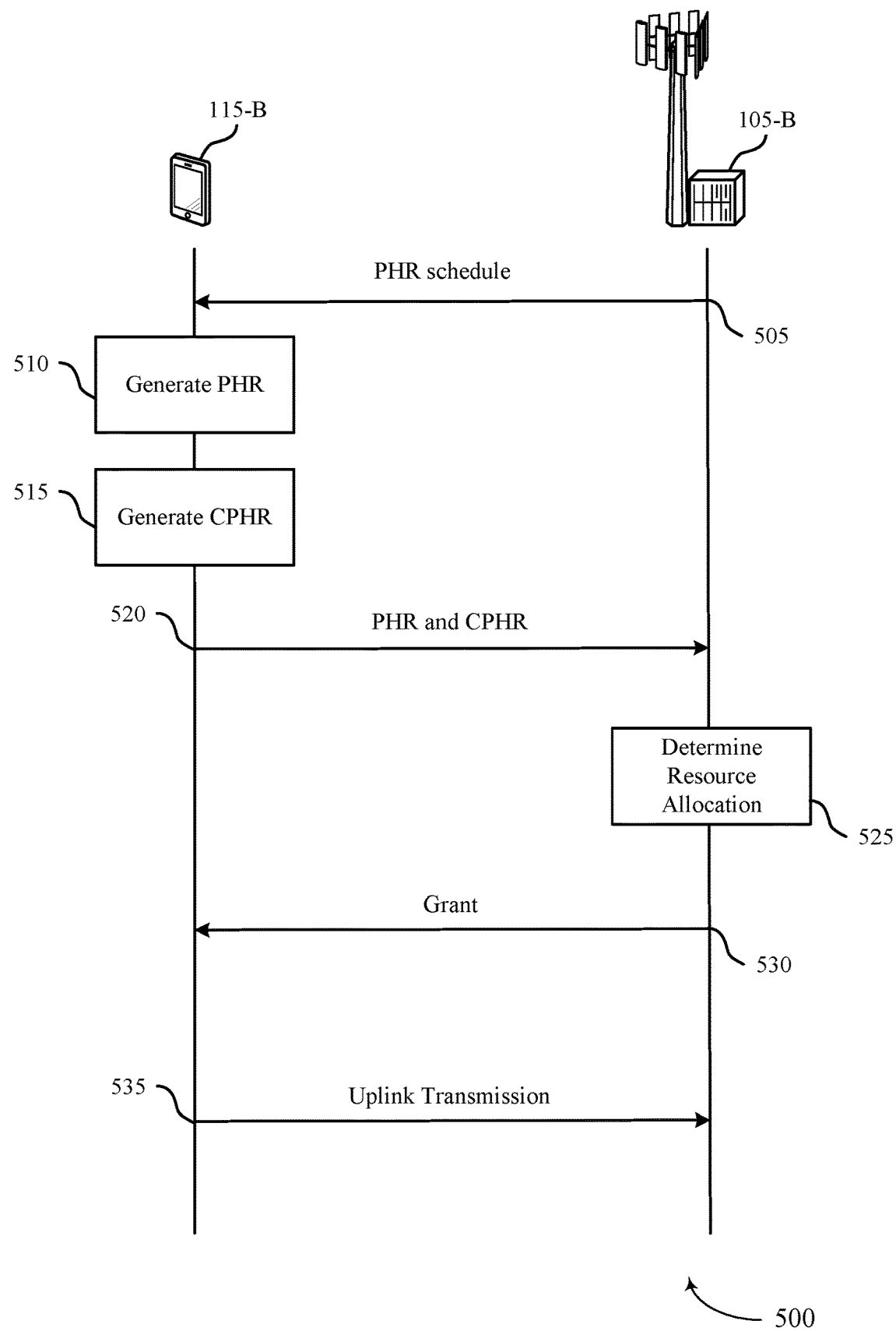
FIG. 5 illustrates an example of a process flow that supports power headroom report for LTE-NR co-existence in accordance with aspects of the present disclosure.

FIG. 5 illustrates an example of a process flow 500 that supports power headroom report for LTE-NR co-existence in accordance with various aspects of the present disclosure. In some examples, process flow 500 may implement aspects of wireless communications systems 100 and 200. In some examples, process flow 500 may include UE 115-*b* and base station 105-*b*, which may be examples of corresponding devices discussed with reference to FIGS. 1-4.

At 505, base station 105-*b* may configure the UE 115-*b* to transmit a PHR for each RAT on a specific reporting schedule. For example, the base station 105-*b* may transmit at least one PHR schedule to UE 115-*b*. UE 115-*b* may utilize the at least one PHR schedule to determine when to send PHRs for the first RAT and when to send PHRs for the second RAT.

At 510, UE 115-*b* may generate PHRs for the first RAT and the second RAT based on the schedule set at 505. In the case that a PHR is due for the first RAT, UE 115-*b* may determine a PH value as a function of a maximum transmission power of the UE 115-*b* and an estimated scheduled transmission power. The estimated scheduled transmission power may be a function of scheduled transmission power in a control channel of the first RAT, or a shared channel of the first RAT, or a combination of both. In the case that a PHR is due for a second RAT, the UE 115-*b* may generate a PHR for the second RAT in a similar way. The PHR may include a virtual PH value based on a hypothetical transmission and may specify a maximum transmission power of the UE 115-*b*.

At 515, the UE 115-*b* may generate a companion power headroom report CPHR. In the case that a PHR is due for the first RAT, the UE 115-*b* may calculate a PH value for the second RAT as a function of a maximum transmission power of the UE 115-*b* and an estimated transmission power of the second RAT. The estimated transmission power may be a function of scheduled transmission power in a control channel of the second RAT, or a shared channel of the second RAT, or any combination thereof. In the case that a PHR is due for a second RAT, the UE 115-*b* may generate a CPHR for the first RAT in a similar way. The CPHR may include a virtual PH value. The CPHR may include a maximum transmission power of the UE 115-*b*. In some examples, the first and second RAT may utilize different numerologies where a duration of a set of TTIs of the second RAT may correspond to a duration of a single TTI (e.g., the TTI of the first RAT). In some examples, the UE 115-*b* may determine an average PH for the two or more of the multiple TTIs, wherein the companion PHR includes the average PH. In another example, the UE 115-*b* may identify a reference TTI in the two or more of the multiple TTIs and then determine PH for the reference TTI. The companion PHR may include the PH value for the reference TTI. In some cases, the UE 115-*b* may determine PH value for each of the set of TTIs, and may include the determined PH for each of the multiple of TTIs in the CPHR.

In another case, the UE 115-*b* may determine that a first TTI of multiple TTIs includes a scheduled transmission and that a second TTI of the multiple f TTIs does not include a scheduled transmission. The UE 115-*b* may calculate a PH value for the first TTI. The companion PHR may include the determined PH for the first TTI. In another example, the UE 115-*b* may determine a virtual PH value for the second TTI. The CPHR may also include the virtual PH value for the second TTI.

At 520, UE 115-*b* may transmit a PHR and a CPHR to the base station 105-*b*. When a PHR is scheduled for the first RAT, the base station 105-*b* may receive a PHR for the first RAT and a companion PHR for the second RAT. When a PHR is scheduled for the second RAT, the base station 105-*b* may receive a PHR for the second RAT and a CPHR for the first RAT.

At 525, the base station 105-*b* may determine resource allocation based on the PHR and the CPHR. For example, a base station 105-*b* may adjust a bandwidth allocation for one or both of the RATs. At 530, the base station 105-*b* may transmit a grant to the UE 115-*b* that may or might not change a resource allocation, and the UE 115-*b* may use the allocated resources to transmit to the base station 105-*b* at 535. The process flow 500 may repeat one or more times.

Figure 6:
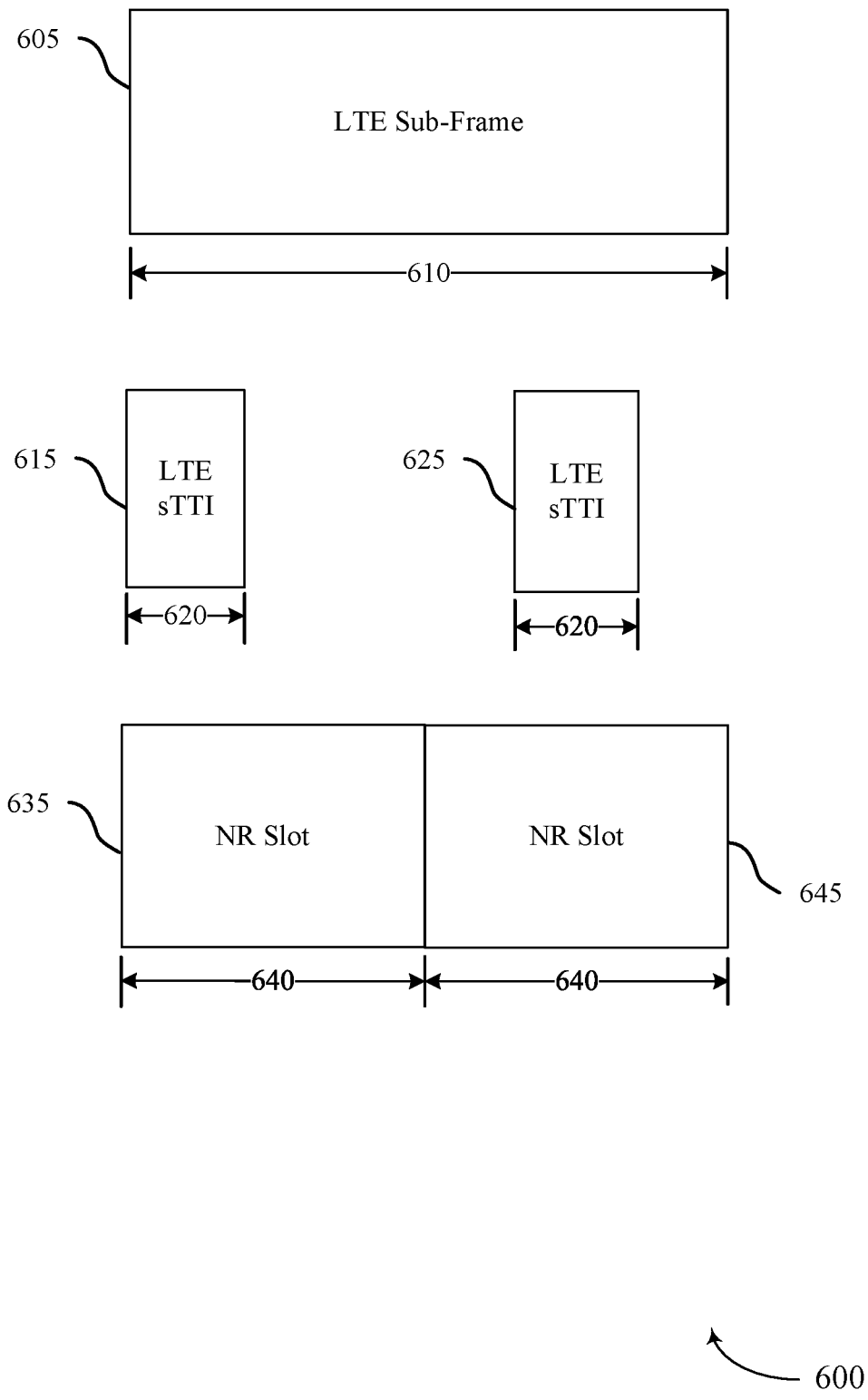
FIG. 6 illustrates an example of a timing configuration that supports power headroom report for LTE-NR co-existence in accordance with aspects of the present disclosure.

FIG. 6 illustrates an example of a timing configuration 600 that supports power headroom report for LTE-NR co-existence in accordance with various aspects of the present disclosure. In some examples, techniques and devices described with reference to FIGS. 1-5 may implement aspects of timing configuration 600. In some examples, a UE 115 may support joint power management that dynamically splits transmission power between two or more RATs. In such examples, UE 115 may dynamically share uplink transmission power between uplink transmit channels corresponding to any number of RATs.

A base station 105 may transmit an indication of a PHR type, and the PHR type may identify the one or more channels for one or more RATs on which the UE 115 is to calculate PH. UE 115 may receive the indication, and may generate a joint PHR based on the identified channels and/or RATs corresponding to the type. If UE 115 receives a PHR type that indicates only LTE channels, then the UE 115 may determine PH for the data and/or control channels in LTE. For example, the UE 115 may determine a power headroom value as a difference between a maximum transmission power of the UE 115 and a total of the scheduled transmission power for the data and/or control channels. If UE 115 receives a PHR type that indicates only NR channels, then the UE 115 may determine PH for the data and/or control channels in NR. For example, the UE 115 may determine a power headroom value as a difference between a maximum transmission power of the UE 115 and a total of the scheduled transmission power for the data and/or control channels. If UE 115 receives a PHR type that includes both NR and LTE channels, UE 115 may determine power headroom value as a difference between a maximum transmission power of the UE 115 and a total of the scheduled transmission power for the data and/or control channels in NR and LTE.

The UE 115 may calculate power headroom for any number of channels for any number of RATs. The UE 115 may determine a total amount of the scheduled amount of transmission power in each channel, and calculate a PH value by subtracting the total from the maximum transmission power of the UE 115. In an example, a first PH type may instruct the UE 115 to determine a PH value for a LTE PUSCH transmission. UE 115 may determine a PH value by subtracting the estimated power for the PUSCH transmission from the maximum transmission power of the UE 115. In another example, a second PH type may instruct the UE 115 to determine a PH value for a LTE PUSCH transmission and a LTE PUCCH transmission. In such an example, the UE 115 may determine a PH value by subtracting a total of the estimated PUSCH transmission power and the estimated PUCCH transmission power from the maximum transmission power of the UE 115.

Below are examples of PH types, and additional PH types may be defined for these or other RATs. A third PH type may instruct the UE 115 to determine a PH value for a LTE PUSCH transmission and a NR PUSCH transmission. A fourth PH type may instruct the UE 115 to determine a PH value for a LTE PUSCH transmission and a NR PUCCH transmission. A fifth PH type may instruct the UE 115 to determine a PH value for a LTE PUSCH transmission, a NR PUCCH transmission, and a NR PUSCH transmission. A sixth PH type may instruct the UE 115 to determine a PH value for a LTE PUSCH transmission, a LTE PUCCH transmission, and a NR PUSCH transmission. A seventh PH type may instruct the UE 115 to determine a PH value for a LTE PUSCH, a LTE PUCCH transmission, and a NR PUCCH transmission. An eighth PH type may instruct the UE 115 to determine a PH value for a LTE PUSCH transmission, a LTE PUCCH transmission, a NR PUSCH transmission, and a NR PUCCH transmission. A ninth PH type may instruct the UE 115 to determine a PH value for a LTE PUSCH transmission, an NR PUSCH transmission, and a LTE sTTI transmission. A tenth PH type may instruct the UE 115 to determine a PH value for a LTE PUSCH transmission, a NR PUCCH transmission, and a LTE sTTI transmission. An eleventh PH type may instruct the UE 115 to determine a PH value for a LTE PUSCH transmission, a NR PUCCH transmission, a NR PUSCH transmission, and a LTE sTTI transmission. A twelfth PH type may instruct the UE 115 to determine a PH value for a LTE PUSCH transmission, a LTE PUCCH transmission, a NR PUSCH transmission, and a LTE sTTI transmission. A thirteenth PH type may instruct the UE 115 to determine a PH value for a LTE PUSCH transmission, a LTE PUCCH transmission, a NR PUCCH transmission, and a LTE sTTI transmission. A fourteenth PH type may instruct the UE 115 to determine a PH value for a LTE PUSCH transmission, a LTE PUCCH transmission, a NR PUSCH transmission, a NR PUCCH transmission, and a LTE sTTI transmission.

In some examples, a base station 105 may transmit a second message including a second indication of a second PHR type that may be different than the first PHR type. The second PHR type may identify the one or more channels for one or more RATs on which the UE 115 is to calculate a second PH. UE 115 may receive the indication, and may generate a joint PHR based on the identified channels and/or RATs corresponding to the second PHR type. UE 115 may determine power headroom value as a difference between a maximum transmission power of the UE 115 and a total of the scheduled transmission power for the data and/or control channels in NR and/or LTE. UE 115 may determine a second joint PHR based on the second PHR type, and may transmit the second joint PHR to base station 105. Base station 105 may determine whether to adjust allocated resources based on the second joint PHR.

UE 115 may determine when to send a joint PHR based on the granularity of TTI durations of the supported RATs. A supported RAT may have PHR reporting periodicity that corresponds to the TTI duration of the RAT. Thus, a RAT with a longer TTI duration may have a longer periodicity. A UE 115 may determine a PHR reporting timeline (e.g., a PHR schedule) corresponding to the shorter of the TTI durations of the multiple supported RATs. For instance, UE 115 may base a PHR schedule on periodicity of the shortest TTI duration (e.g., LTE sTTI 620). The shortest TTI duration may correspond to the shortest periodicity as to when the UE 115 is configured to send a PHR.

In some examples, a UE 115 may support multiple RATs that have different numerologies and TTI durations. In some examples, even within a single RAT, TTI duration may vary. For instance, an LTE sub-frame 605 may have a first TTI duration 610 (e.g., 1 ms), and sTTIs in LTE may have a TTI duration 620 that is shortest than TTI duration 610. LTE sTTIs 615 and 625 may be utilized for certain types of communication (e.g., ultra-reliable low latency communication (URLLC)), A NR slot 635 or NR slot 645 may have a second TTI duration 640 (e.g., 0.5 ms) that is less than the first TTI duration 610. In addition, LTE sTTIs 615 and 625 may have a TTI duration 620 that is shorter than TTI duration 640. In some cases, an NR mini slot (not shown) may have a TTI duration even shorter than duration 620. As shown in FIG. 6, the boundaries of the varying TTIs may not be aligned in some scenarios. A periodicity corresponding to the shortest TTI duration of the multiple RATs (e.g. TTI duration 620 corresponding to LTE sTTI 615) may be the shortest periodicity of the multiple supported RATs. UE 115 may determine a schedule of when to send a joint PHR based on the periodicity corresponding to the shortest TTI duration, and may transmit joint PHRs based on or at this shortest periodicity. Base station 105 may determine resource allocation for subsequent transmissions based on the joint PHR. UE 115 may receive a grant including the allocated resources, and may send an uplink transmission based thereon.

Figure 7:
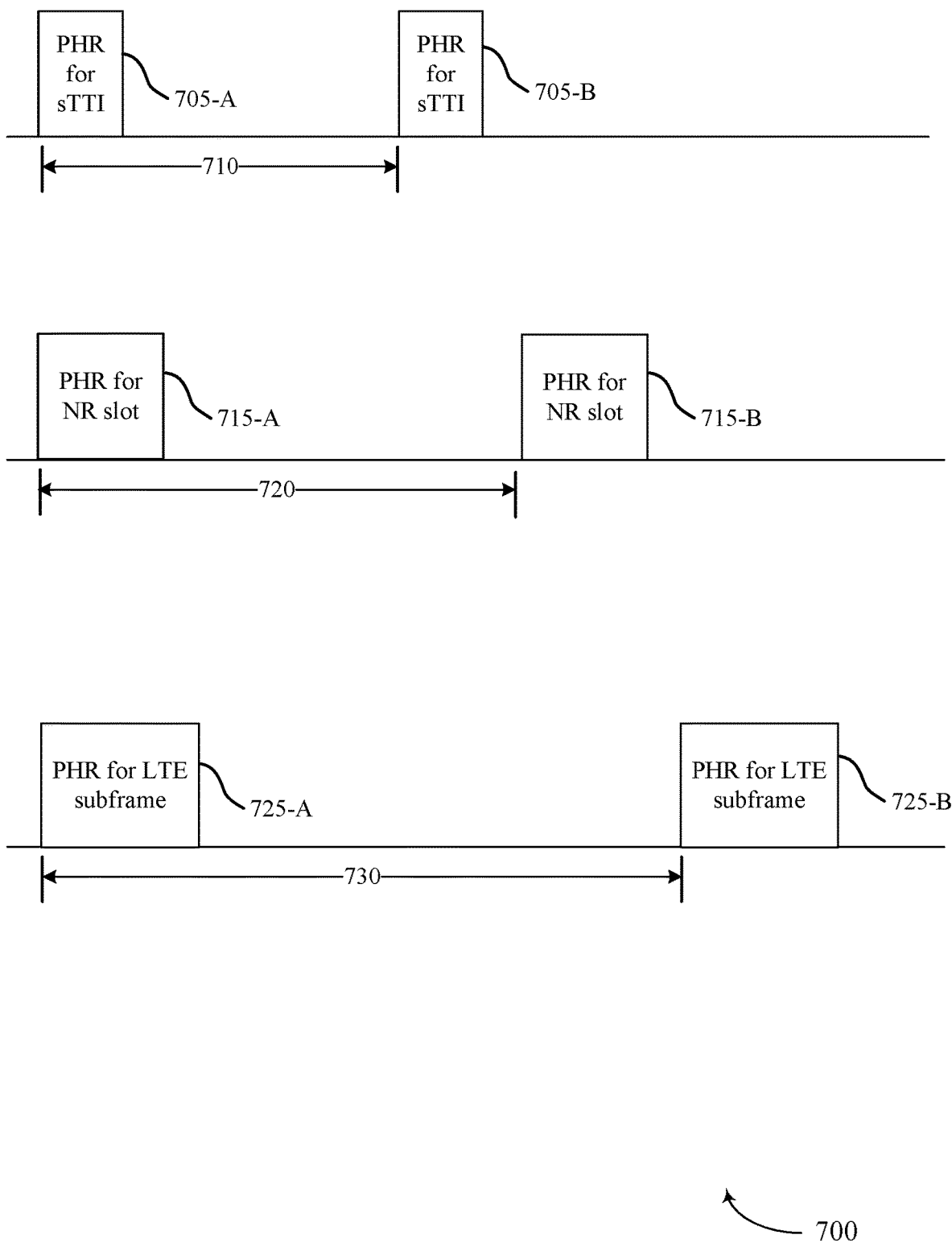
FIG. 7 illustrates an example of a PHR schedule that supports power headroom report for LTE-NR co-existence in accordance with aspects of the present disclosure.

FIG. 7 illustrates an example of a timing diagram 700 that supports power headroom report for LTE-NR co-existence in accordance with various aspects of the present disclosure. In some examples, techniques and devices described with reference to FIGS. 1-6 may implement aspects of timing diagram 700. As discussed with reference to FIG. 6, different RATs may correspond to different TTI durations, and TTI durations may vary within the same RAT. For example, an LTE PHR schedule utilizing sTTIs (for URLLC communications or other applications that require sTTIs) may include PHRs for sTTI 705-a and 705-b. UE 115 may be scheduled to send sTTI PHRs in sTTIs 705-a, 705-b that occur with periodicity 710. UE 115 may be scheduled to send NR PHRs in NR slots 715-a, and NR slot 715-b, that occur with periodicity 720, which may be greater than the periodicity 710. UE 115 may be scheduled to send LTE PHRs in LTE subframes 725-a, 725-b that occur with periodicity 730. In some cases, periodicity 730 have a longer duration than both periodicities 720 and 710. A UE 115 that supports multiple TTI durations may determine a periodicity with which to send joint PHRs based on the RAT having with the shortest TTI duration (and therefore the shortest periodicity). For instance, a UE that supports communication on sTTIs, NR slots, and LTE subframe may determine a joint PHR schedule based on periodicity 710. Base station 105 may determine resource allocation for subsequent transmissions based on the joint PHR. UE 115 may receive a grant including the allocated resources, and may send an uplink transmission based thereon.

Figure 8:
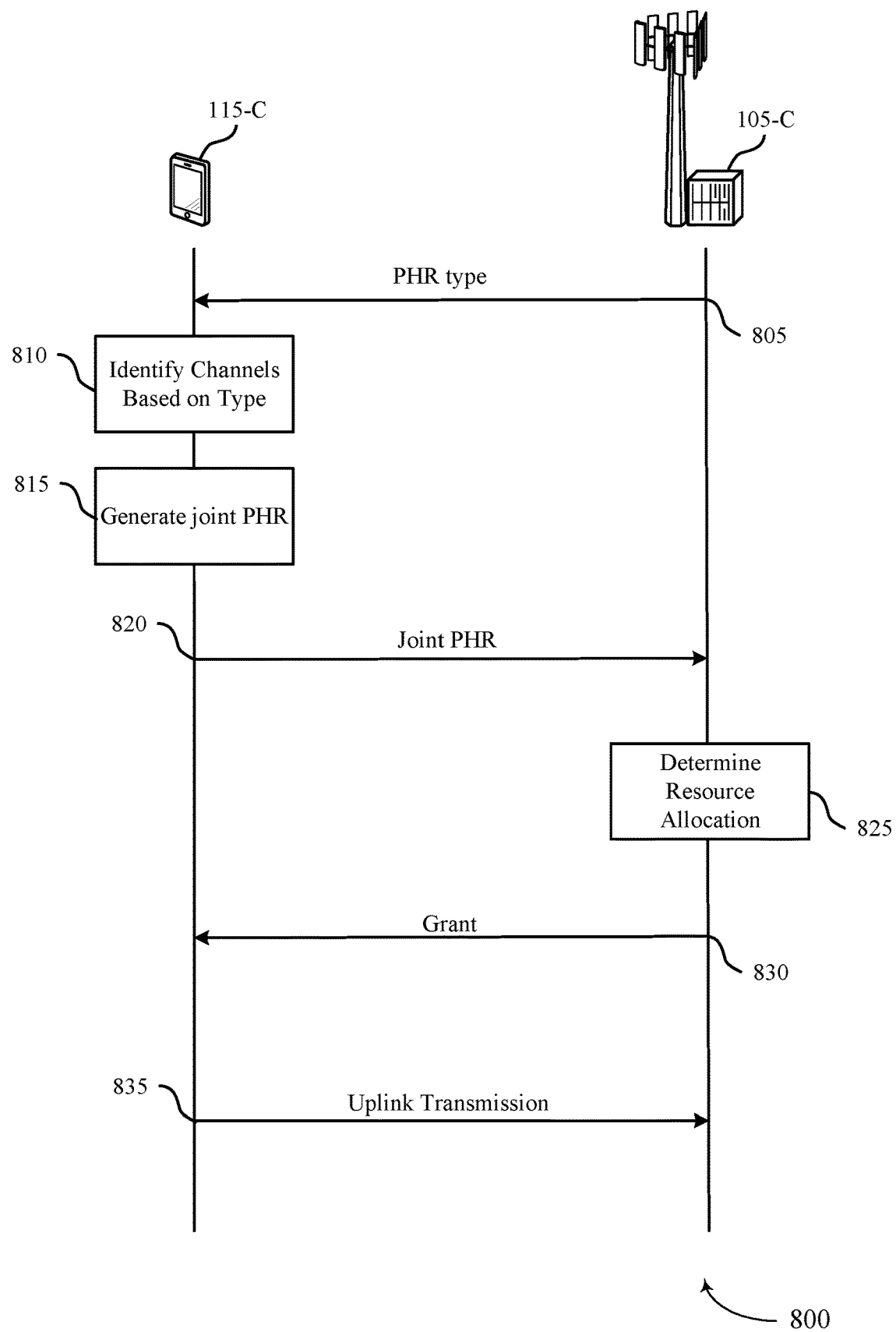
FIG. 8 illustrates an example of a process flow that supports power headroom report for LTE-NR co-existence in accordance with aspects of the present disclosure.

FIG. 8 illustrates an example of a process flow 800 that supports power headroom report for LTE-NR co-existence in accordance with various aspects of the present disclosure. In some examples, techniques described with reference to FIGS. 1-7 may implement aspects of process flow 800. Base station 105-c and UE 115-c may be examples of corresponding devices discussed with respect to wireless communications systems 100 and 200, and process flow 500.

At 805, the base station 105-c may send a PH type message to the UE 115-c. The message may specify a PH type corresponding to at least one channel of the first RAT and at least one channel of the second RAT. At 810, The UE 115-c may identify the channels specified by the received PH type.

At 815, the UE 115-c may generate a joint PHR based on the received PHR type. Since the first and second RAT may use different numerology, a schedule for reporting the joint PH may correspond to a shorter of the first TTI duration and the second TTI duration. The first TTI duration or the second TTI duration may correspond to a duration of a short TTI (sTTI) or a mini-slot. The UE 115-c may calculate a PH value as a function of a maximum transmission power of the UE 115-c and an estimated transmission power, wherein the estimated transmission power is a function of scheduled transmission power in a control channel of the first RAT, or a shortened TTI of the first RAT, or a control channel of the second RAT, or a shared channel of the first RAT, or a shared channel of the second RAT, or a combination. The joint PHR may include the calculated PH and a maximum transmission power of the UE 115-c.

At 820, the UE 115-c may transmit the joint PHR to the base station 105-c. At 825, the base station 105-c may determine whether or not to adjust resources based on the joint PHR (e.g., increase or decrease amount of allocated bandwidth). At 830, the base station 105-c may transmit a grant to the UE 115-c indicating resources that have been allocated to the UE 115-c, and may or might not indicate a change in allocated resources from a prior grant (e.g., a changed or unchanged bandwidth). The UE 115-c may transmit an uplink signal to the base station 105-c at 835 based on the grant. The process 800 may repeat one or more times.

Figure 9:
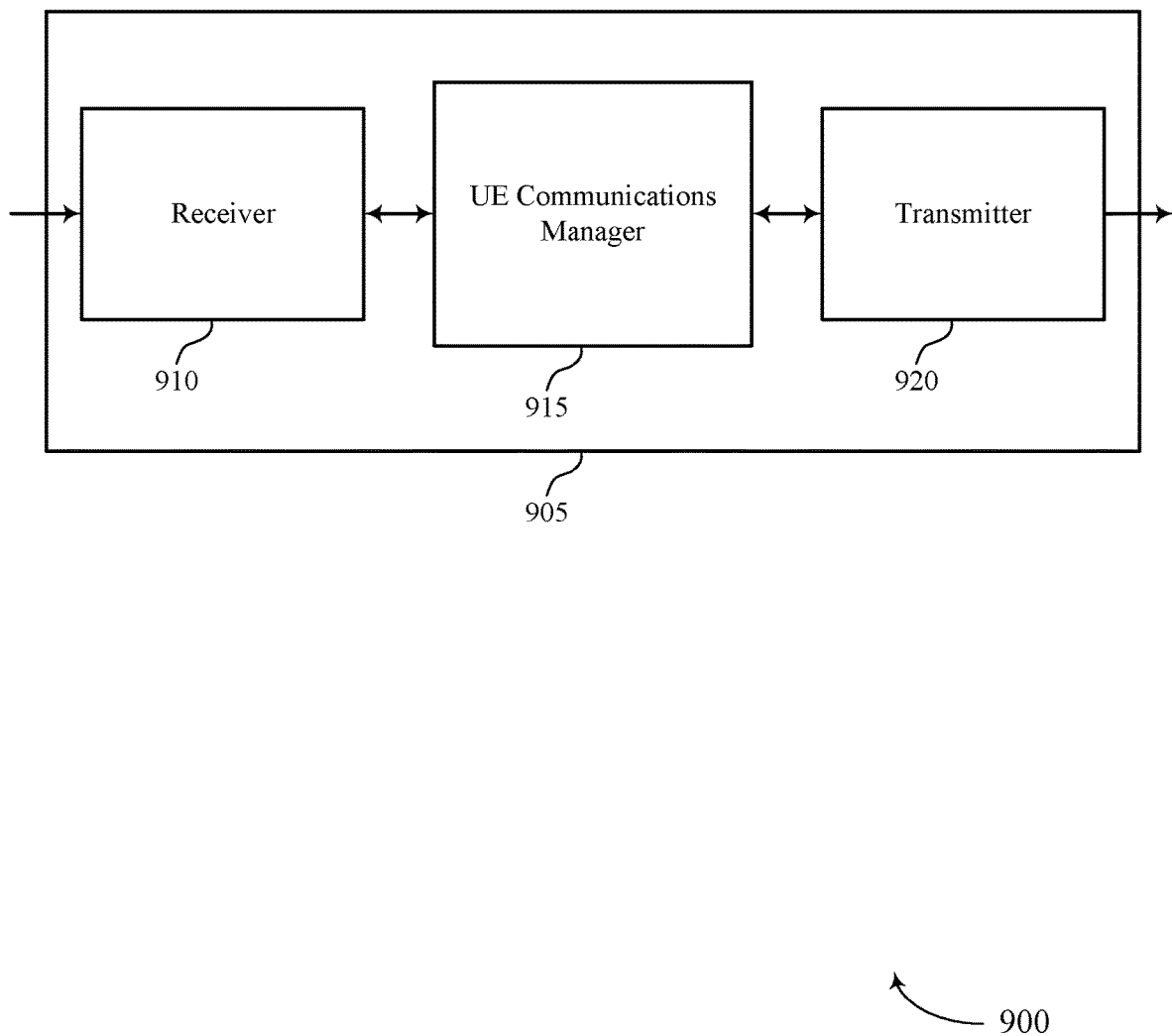
FIGS. 9 through 11 show block diagrams of a device that supports power headroom report for LTE-NR co-existence in accordance with aspects of the present disclosure.

FIG. 9 shows a block diagram 900 of a wireless device 905 that supports power headroom report for LTE-NR co-existence in accordance with aspects of the present disclosure. Wireless device 905 may be an example of aspects of a user equipment (UE) 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to power headroom report for LTE-NR co-existence, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12. UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may determine a first power headroom reporting schedule for the first RAT, and a second power headroom reporting schedule for a second RAT different from the first power headroom reporting schedule, generate a PHR for the first RAT and a companion PHR for the second RAT, and transmit the PHR and the companion PHR based on the first power headroom reporting schedule. The UE communications manager 915 may also receive a signal specifying a PHR type, the PHR type associated with at least one channel of a first RAT and at least one channel of a second RAT, generate a joint PHR for the at least one channel of the first RAT and the at least one channel of the second RAT according to the PHR type, and transmit the joint PHR.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
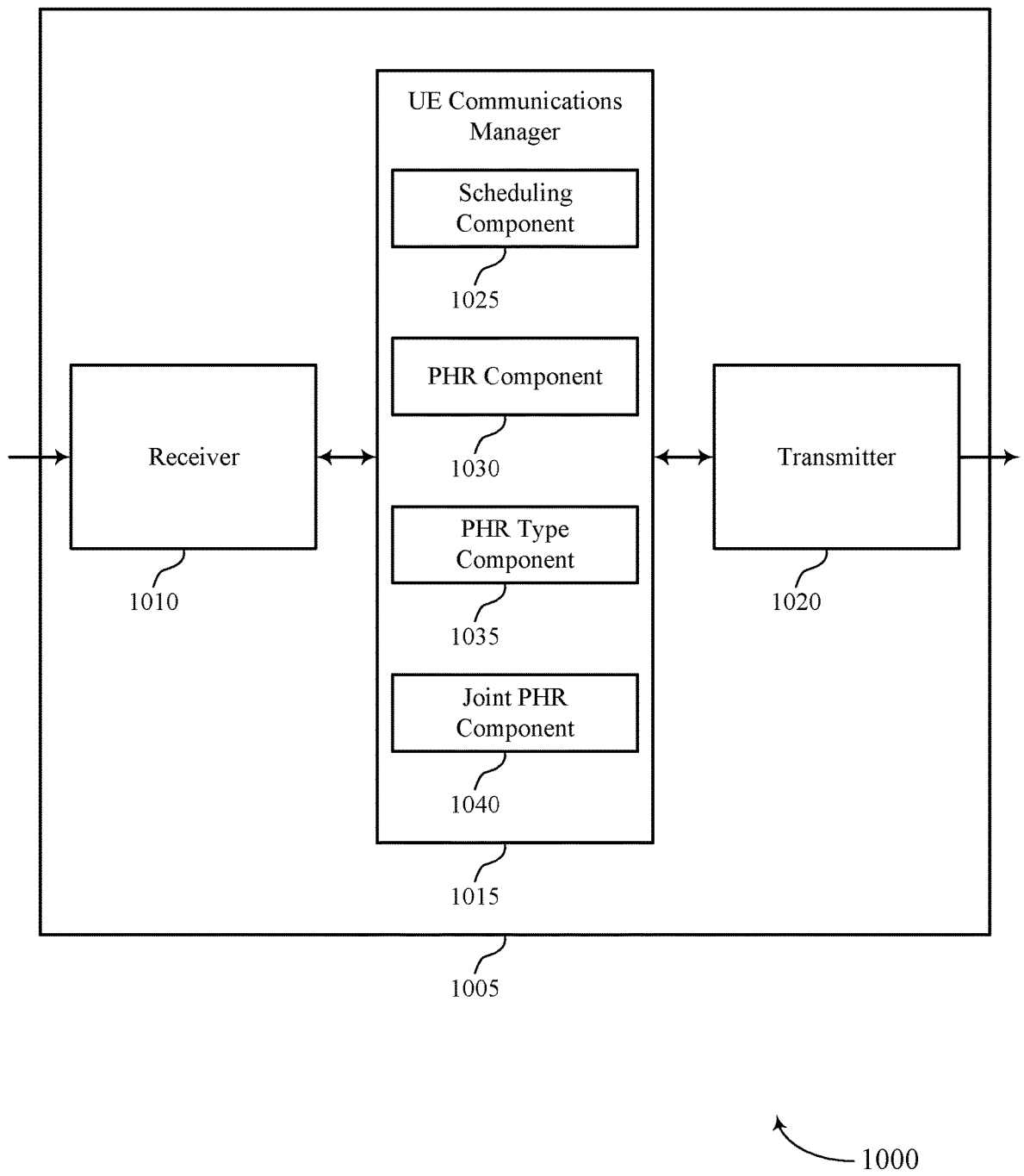

FIG. 10 shows a block diagram 1000 of a wireless device 1005 that supports power headroom report for LTE-NR co-existence in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to power headroom report for LTE-NR co-existence, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include scheduling component 1025, PHR component 1030, PHR type component 1035, and joint PHR component 1040.

Scheduling component 1025 may determine a first power headroom reporting schedule for the first RAT, and a second power headroom reporting schedule for a second RAT different from the first power headroom reporting schedule, determine that two or more of the set of TTIs each include a scheduled transmission, and determine a PHR reporting timeline corresponding to a shorter of the first TTI duration and the second TTI duration, where transmitting the joint PHR is based on the determined PHR reporting timeline.

PHR component 1030 may generate a PHR for the first RAT and a companion PHR for the second RAT, transmit the PHR and the companion PHR based on the first power headroom reporting schedule, determine power headroom for each of the set of TTIs, where the companion PHR includes the determined power headroom for the each of the set of TTIs, determine power headroom for the first TTI, where the companion PHR includes the determined power headroom for the first TTI, generate a PHR for the second RAT and a companion PHR for the first RAT, and transmit the PHR for the second RAT and the companion PHR for the first RAT based on the second power headroom reporting schedule.

In some cases, generating the PHR includes: determining power headroom as a function of a maximum transmission power of the UE and an estimated transmission power, where the estimated transmission power is a function of scheduled transmission power in a control channel of the first RAT, or a shared channel of the first RAT, or any combination thereof. In some cases, generating the companion PHR includes: determining power headroom as a function of a maximum transmission power of the UE and an estimated transmission power, where the estimated transmission power is a function of scheduled transmission power in a control channel of the second RAT, or a shared channel of the second RAT, or any combination thereof. In some cases, at least one of the PHR or the companion PHR includes a maximum transmission power of the UE. In some cases, the PHR for the first RAT and the companion PHR for the second RAT are configured based on a semi-static power split between the first RAT and the second RAT.

PHR type component 1035 may receive a signal specifying a PHR type, the PHR type associated with at least one channel of a first RAT and at least one channel of a second RAT.

Joint PHR component 1040 may generate a joint PHR for the at least one channel of the first RAT and the at least one channel of the second RAT according to the PHR type and transmit the joint PHR. In some cases, generating the joint PHR further includes: determining power headroom as a function of a maximum transmission power of the UE and an estimated transmission power, where the estimated transmission power is a function of scheduled transmission power in a control channel of the first RAT, or a shortened TTI of the first RAT, or a control channel of the second RAT, or a shared channel of the first RAT, or a shared channel of the second RAT, or any combination thereof. In some cases, the joint PHR includes a maximum transmission power of the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
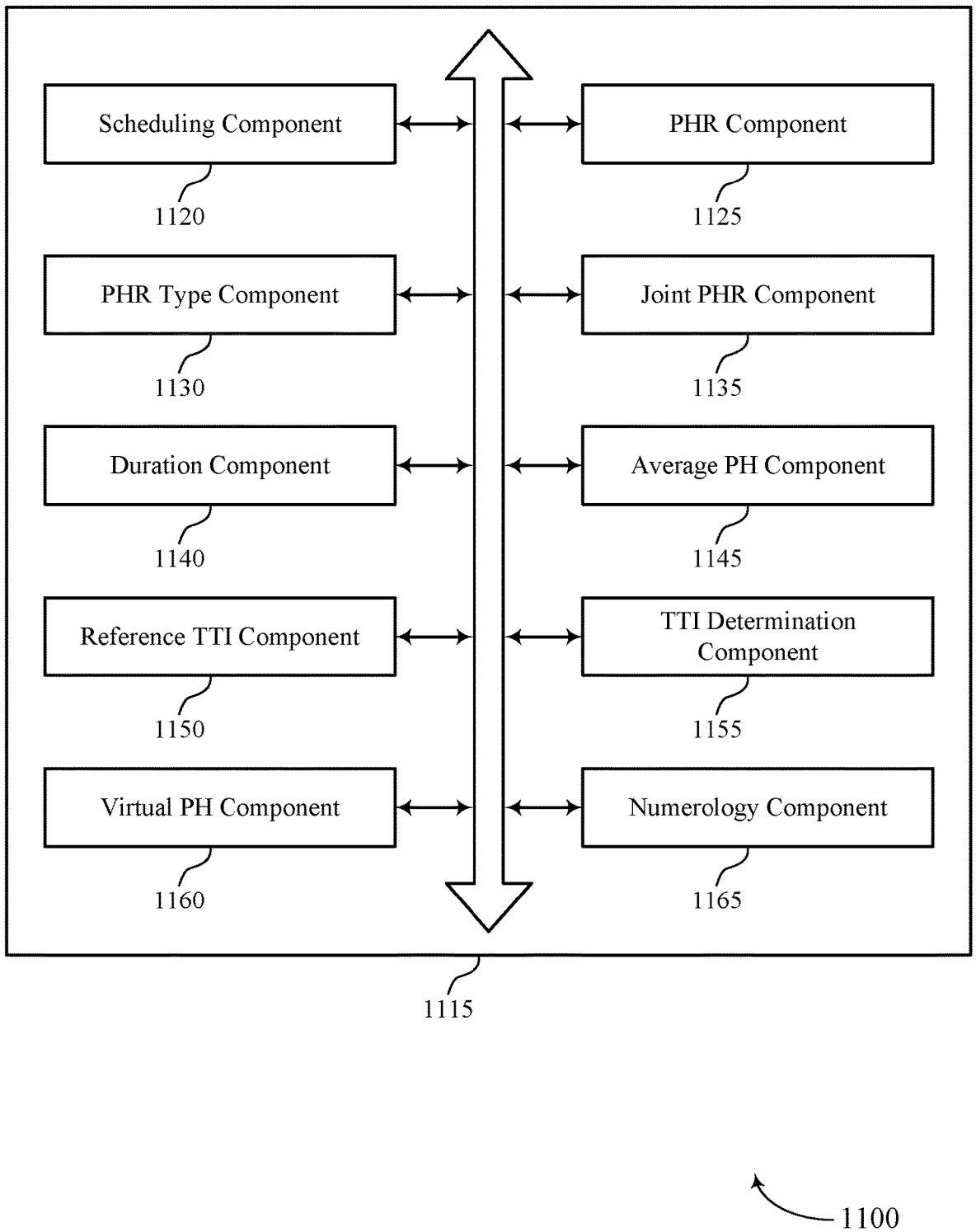

FIG. 11 shows a block diagram 1100 of a UE communications manager 1115 that supports power headroom report for LTE-NR co-existence in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include scheduling component 1120, PHR component 1125, PHR type component 1130, joint PHR component 1135, duration component 1140, average PH component 1145, reference TTI component 1150, TTI determination component 1155, virtual PH component 1160, and numerology component 1165. Each of these modules may communicate, directly or indirectly, with one another (e.g., via one or more buses).

Scheduling component 1120 may determine a first power headroom reporting schedule for the first RAT, and a second power headroom reporting schedule for a second RAT different from the first power headroom reporting schedule, determine that two or more of the set of TTIs each include a scheduled transmission, and determine a PHR reporting timeline corresponding to a shorter of the first TTI duration and the second TTI duration, where transmitting the joint PHR is based on the determined PHR reporting timeline.

PHR component 1125 may generate a PHR for the first RAT and a companion PHR for the second RAT, transmit the PHR and the companion PHR based on the first power headroom reporting schedule, determine power headroom for each of the set of TTIs, where the companion PHR includes the determined power headroom for the each of the set of TTIs, determine power headroom for the first TTI, where the companion PHR includes the determined power headroom for the first TTI, generate a PHR for the second RAT and a companion PHR for the first RAT, and transmit the PHR for the second RAT and the companion PHR for the first RAT based on the second power headroom reporting schedule.

In some cases, generating the PHR includes: determining power headroom as a function of a maximum transmission power of the UE and an estimated transmission power, where the estimated transmission power is a function of scheduled transmission power in a control channel of the first RAT, or a shared channel of the first RAT, or any combination thereof. In some cases, generating the companion PHR includes: determining power headroom as a function of a maximum transmission power of the UE and an estimated transmission power, where the estimated transmission power is a function of scheduled transmission power in a control channel of the second RAT, or a shared channel of the second RAT, or any combination thereof. In some cases, at least one of the PHR or the companion PHR includes a maximum transmission power of the UE. In some cases, the PHR for the first RAT and the companion PHR for the second RAT are configured based on a semi-static power split between the first RAT and the second RAT.

PHR type component 1130 may receive a signal specifying a PHR type, the PHR type associated with at least one channel of a first RAT and at least one channel of a second RAT.

Joint PHR component 1135 may generate a joint PHR for the at least one channel of the first RAT and the at least one channel of the second RAT according to the PHR type and transmit the joint PHR. In some cases, generating the joint PHR further includes: determining power headroom as a function of a maximum transmission power of the UE and an estimated transmission power, where the estimated transmission power is a function of scheduled transmission power in a control channel of the first RAT, or a shortened TTI of the first RAT, or a control channel of the second RAT, or a shared channel of the first RAT, or a shared channel of the second RAT, or any combination thereof. In some cases, the joint PHR includes a maximum transmission power of the UE.

Duration component 1140 may determine that the first RAT and the second RAT may communicate using different numerologies. In some cases, a duration of a set of TTIs of the second RAT corresponds to a duration of a single TTI of the first RAT. Average PH component 1145 may determine average power headroom for the two or more of the set of TTIs, where the companion PHR includes the average power headroom. Reference TTI component 1150 may identify a reference TTI in the two or more of the set of TTIs and determine power headroom for the reference TTI, where the companion PHR includes the power headroom for the reference TTI.

TTI determination component 1155 may determine that a first TTI of the set of TTIs includes a scheduled transmission and that a second TTI of the set of TTIs does not include a scheduled transmission. In some cases, the first TTI duration or the second TTI duration corresponds to a duration of a short TTI (sTTI) or a mini-slot.

Virtual PH component 1160 may determine virtual power headroom for the second TTI, where the companion PHR includes the virtual power headroom for the second TTI. In some cases, at least one of the PHR or the companion PHR is a virtual PHR. In some cases, determining the virtual power headroom for the second TTI may include determining the virtual power headroom for the second TTI based on a number of resource blocks. In some cases, the first RAT and the second RAT communicate using different numerology. In some cases, the first RAT and the second RAT communicate using different numerology.

Figure 12:
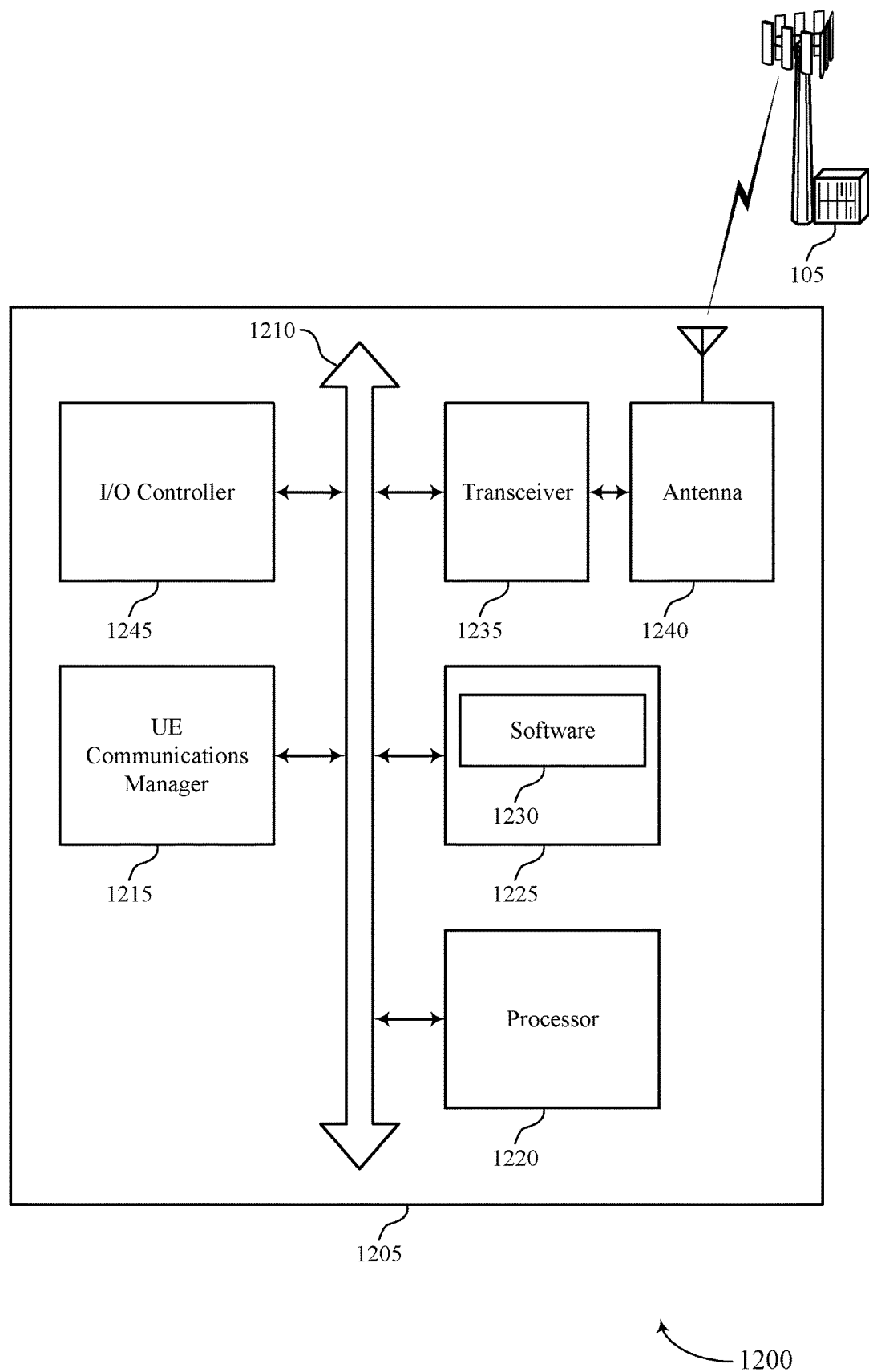
FIG. 12 illustrates a block diagram of a system including a user equipment (UE) that supports power headroom report for LTE-NR co-existence in accordance with aspects of the present disclosure.

FIG. 12 shows a diagram of a system 1200 including a device 1205 that supports power headroom report for LTE-NR co-existence in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting power headroom report for LTE-NR co-existence).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support power headroom report for LTE-NR co-existence. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
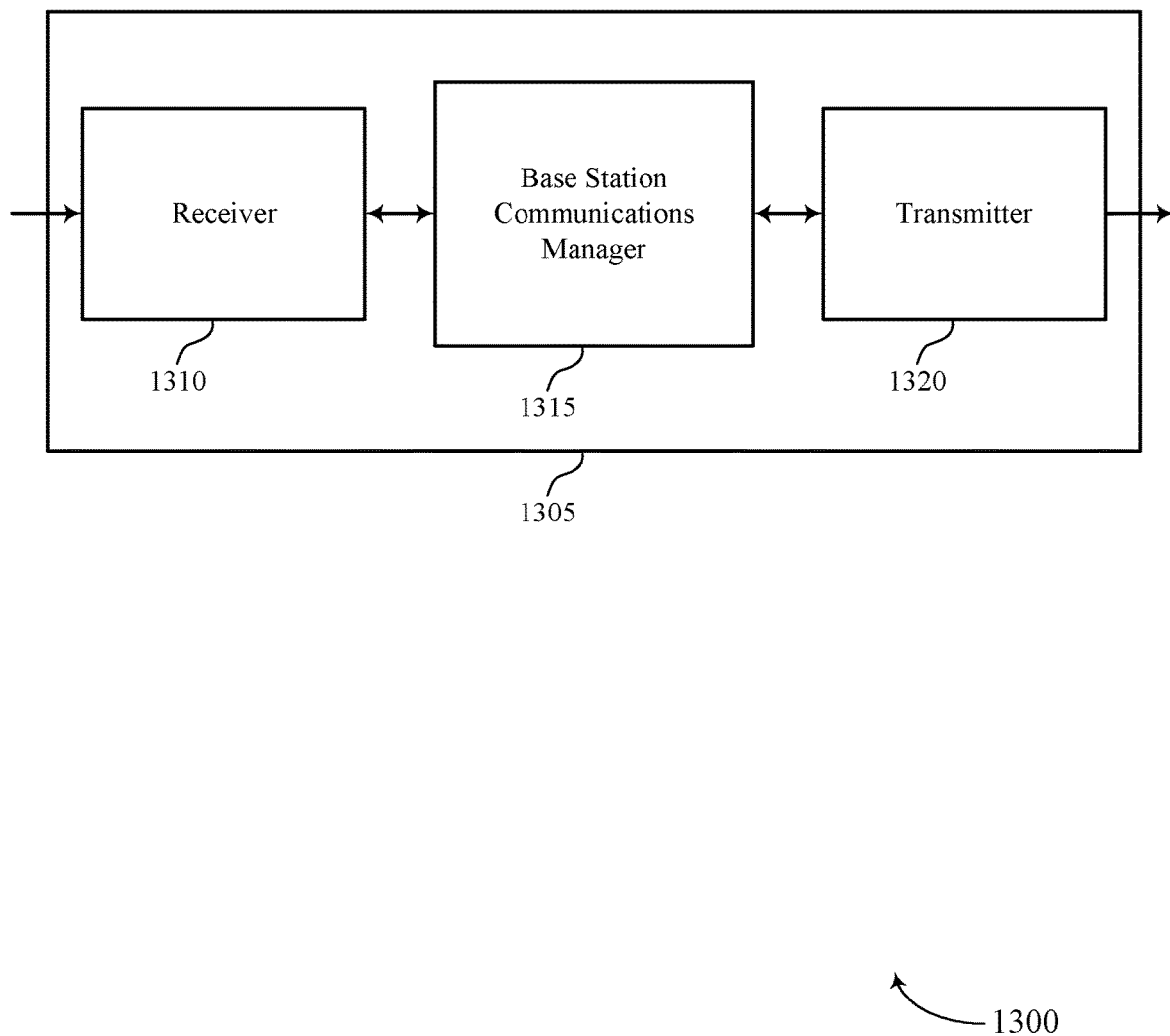
FIGS. 13 through 15 show block diagrams of a device that supports power headroom report for LTE-NR co-existence in accordance with aspects of the present disclosure.

FIG. 13 shows a block diagram 1300 of a wireless device 1305 that supports power headroom report for LTE-NR co-existence in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to power headroom report for LTE-NR co-existence, etc.). Information may be passed on to other components of the device. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16. Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may configure a UE with a first power headroom reporting schedule for the first RAT and a second power headroom reporting schedule for a second RAT, receive a PHR for the first RAT and a companion PHR for a second RAT based on the first power headroom reporting schedule, and allocate resources to the UE based on the PHR for the first RAT and the companion PHR for the second RAT. The base station communications manager 1315 may also transmit a message specifying a PHR type corresponding to at least one channel of the first RAT and at least one channel of the second RAT, receive a joint PHR based on the PHR type, and allocate resources to a UE based on the joint PHR.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
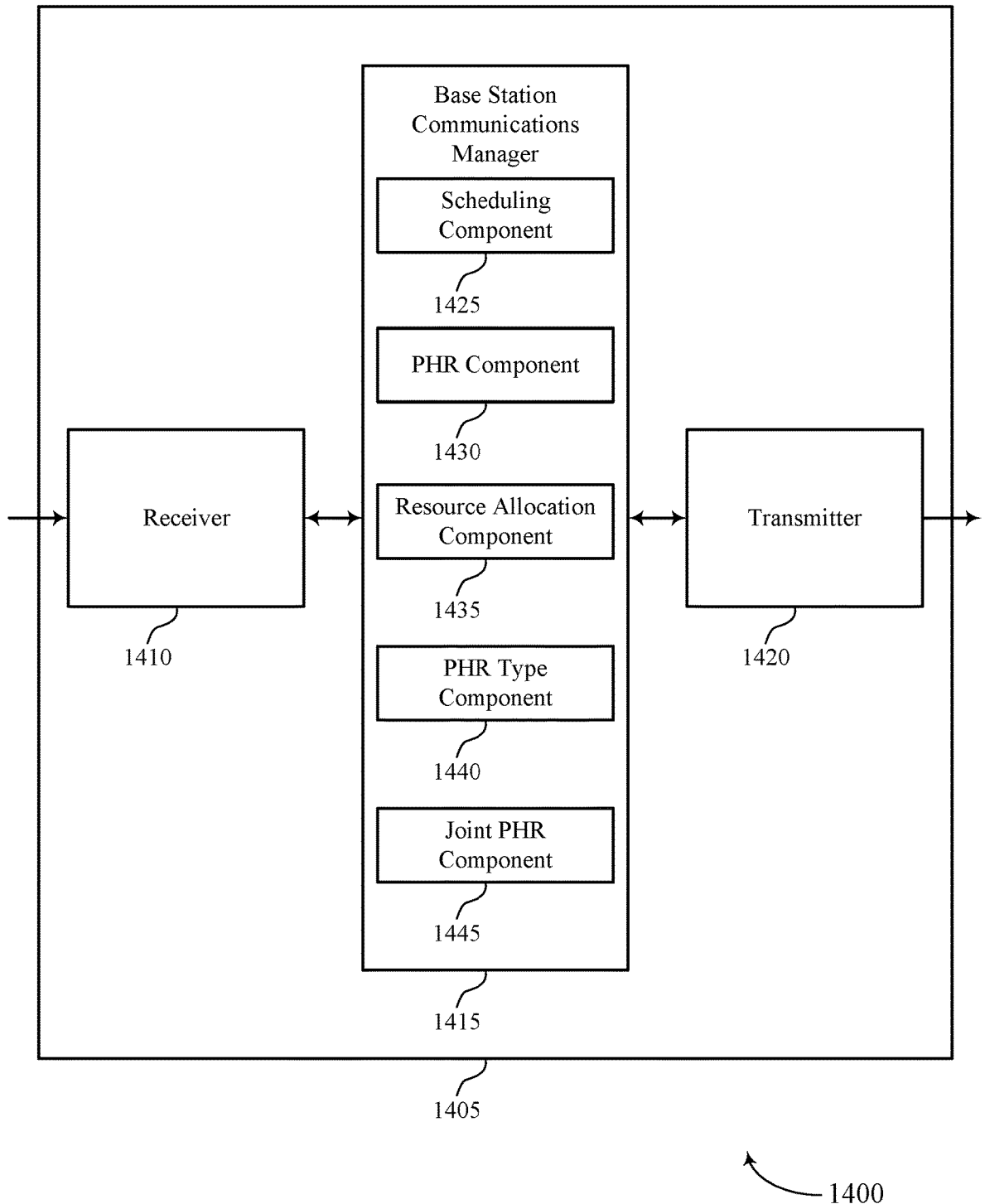

FIG. 14 shows a block diagram 1400 of a wireless device 1405 that supports power headroom report for LTE-NR co-existence in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to power headroom report for LTE-NR co-existence, etc.). Information may be passed on to other components of the device. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16. Base station communications manager 1415 may also include scheduling component 1425, PHR component 1430, resource allocation component 1435, PHR type component 1440, and joint PHR component 1445. Scheduling component 1425 may configure a UE with a first power headroom reporting schedule for the first RAT and a second power headroom reporting schedule for a second RAT.

PHR component 1430 may receive a PHR for the first RAT and a companion PHR for a second RAT based on the first power headroom reporting schedule and receive a PHR for the second RAT and a companion PHR for the first RAT based on the second power headroom reporting schedule.

Resource allocation component 1435 may allocate resources to the UE based on the PHR for the first RAT and the companion PHR for the second RAT, adjust a bandwidth allocation based on the PHR for the first RAT and the companion PHR for the second RAT, determine whether to adjust the allocated resources based on the PHR for the second RAT and the companion PHR for the first RAT, allocate resources to a UE based on the joint PHR, and determine whether to adjust the allocated resources based on the second joint PHR.

PHR type component 1440 may transmit a message specifying a PHR type corresponding to at least one channel of the first RAT and at least one channel of the second RAT. Joint PHR component 1445 may receive a joint PHR based on the PHR type, transmit a second message specifying a second PHR type that differs from the PHR type, and receive a second joint PHR based on the second PHR type.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
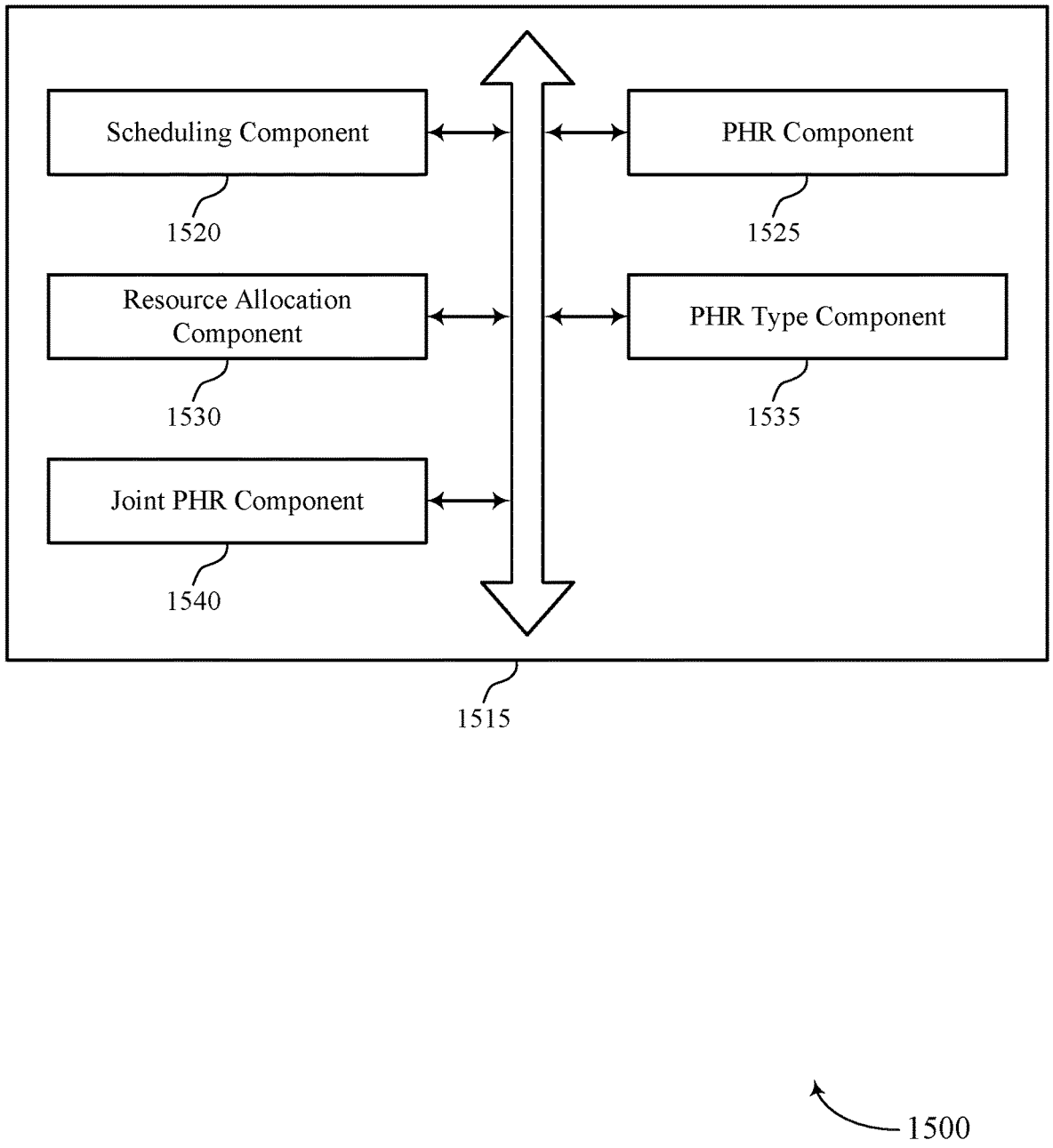

FIG. 15 shows a block diagram 1500 of a base station communications manager 1515 that supports power headroom report for LTE-NR co-existence in accordance with aspects of the present disclosure. The base station communications manager 1515 may be an example of aspects of a base station communications manager 1615 described with reference to FIGS. 13, 14, and 16. The base station communications manager 1515 may include scheduling component 1520, PHR component 1525, resource allocation component 1530, PHR type component 1535, and joint PHR component 1540. Each of these modules may communicate, directly or indirectly, with one another (e.g., via one or more buses).

Scheduling component 1520 may configure a UE with a first power headroom reporting schedule for the first RAT and a second power headroom reporting schedule for a second RAT. PHR component 1525 may receive a PHR for the first RAT and a companion PHR for a second RAT based on the first power headroom reporting schedule and receive a PHR for the second RAT and a companion PHR for the first RAT based on the second power headroom reporting schedule.

Resource allocation component 1530 may allocate resources to the UE based on the PHR for the first RAT and the companion PHR for the second RAT, adjust a bandwidth allocation based on the PHR for the first RAT and the companion PHR for the second RAT, determine whether to adjust the allocated resources based on the PHR for the second RAT and the companion PHR for the first RAT, allocate resources to the UE based on the joint PHR, and determine whether to adjust the allocated resources based on the second joint PHR.

PHR type component 1535 may transmit a message specifying a PHR type corresponding to at least one channel of the first RAT and at least one channel of the second RAT. Joint PHR component 1540 may receive a joint PHR based on the PHR type, transmit a second message specifying a second PHR type that differs from the PHR type, and receive a second joint PHR based on the second PHR type.

Figure 16:
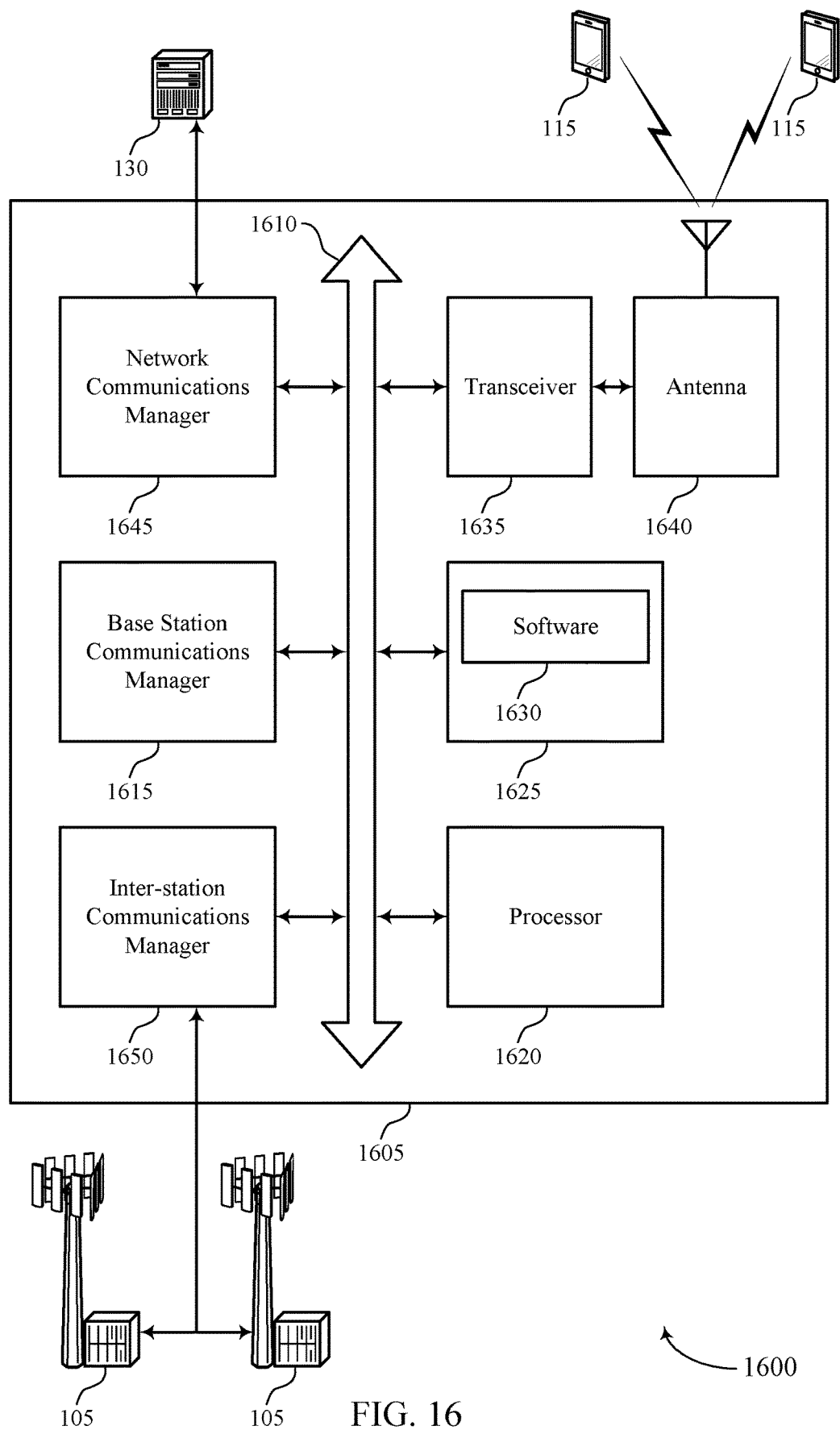
FIG. 16 illustrates a block diagram of a system including a base station that supports power headroom report for LTE-NR co-existence in accordance with aspects of the present disclosure.

FIG. 16 shows a diagram of a system 1600 including a device 1605 that supports power headroom report for LTE-NR co-existence in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting power headroom report for LTE-NR co-existence).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support power headroom report for LTE-NR co-existence. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions. Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an LTE/LTE-A wireless communication network technology to provide communication between base stations 105.

Figure 17:
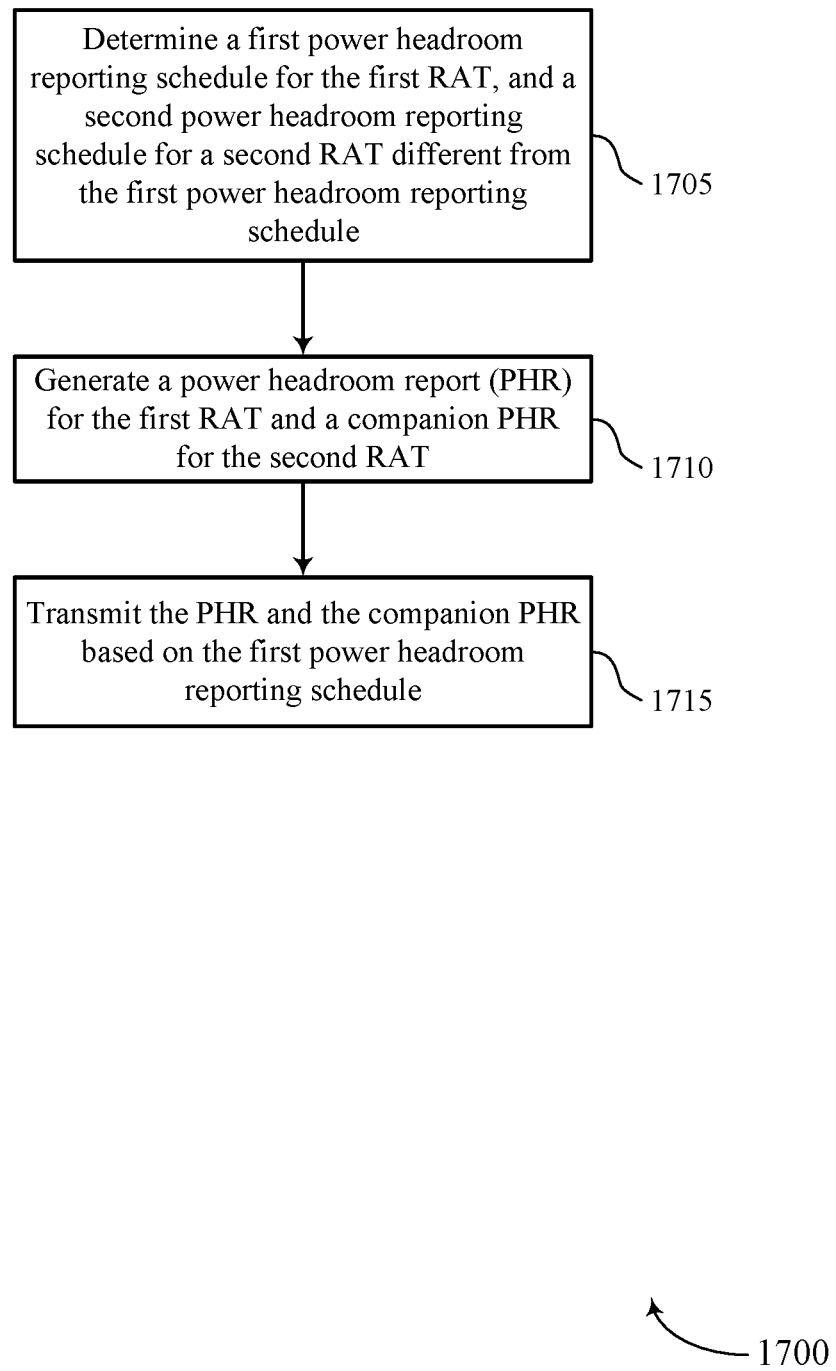
FIGS. 17 through 22 illustrate methods for power headroom report for LTE-NR co-existence in accordance with aspects of the present disclosure.

FIG. 17 shows a flowchart illustrating a method 1700 for power headroom report for LTE-NR co-existence in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may determine a first power headroom reporting schedule for the first RAT, and a second power headroom reporting schedule for a second RAT different from the first power headroom reporting schedule. The operations of block 1705 may be performed according to the methods described herein. In certain examples, aspects of the operations of block 1705 may be performed by a scheduling component as described with reference to FIGS. 9 through 12.

At block 1710 the UE 115 may generate a PHR for the first RAT and a companion PHR for the second RAT. The operations of block 1710 may be performed according to the methods described herein. In certain examples, aspects of the operations of block 1710 may be performed by a PHR component as described with reference to FIGS. 9 through 12.

At block 1715 the UE 115 may transmit the PHR and the companion PHR based at least in part on the first power headroom reporting schedule. The operations of block 1715 may be performed according to the methods described herein. In certain examples, aspects of the operations of block 1715 may be performed by a PHR component as described with reference to FIGS. 9 through 12.

Figure 18:
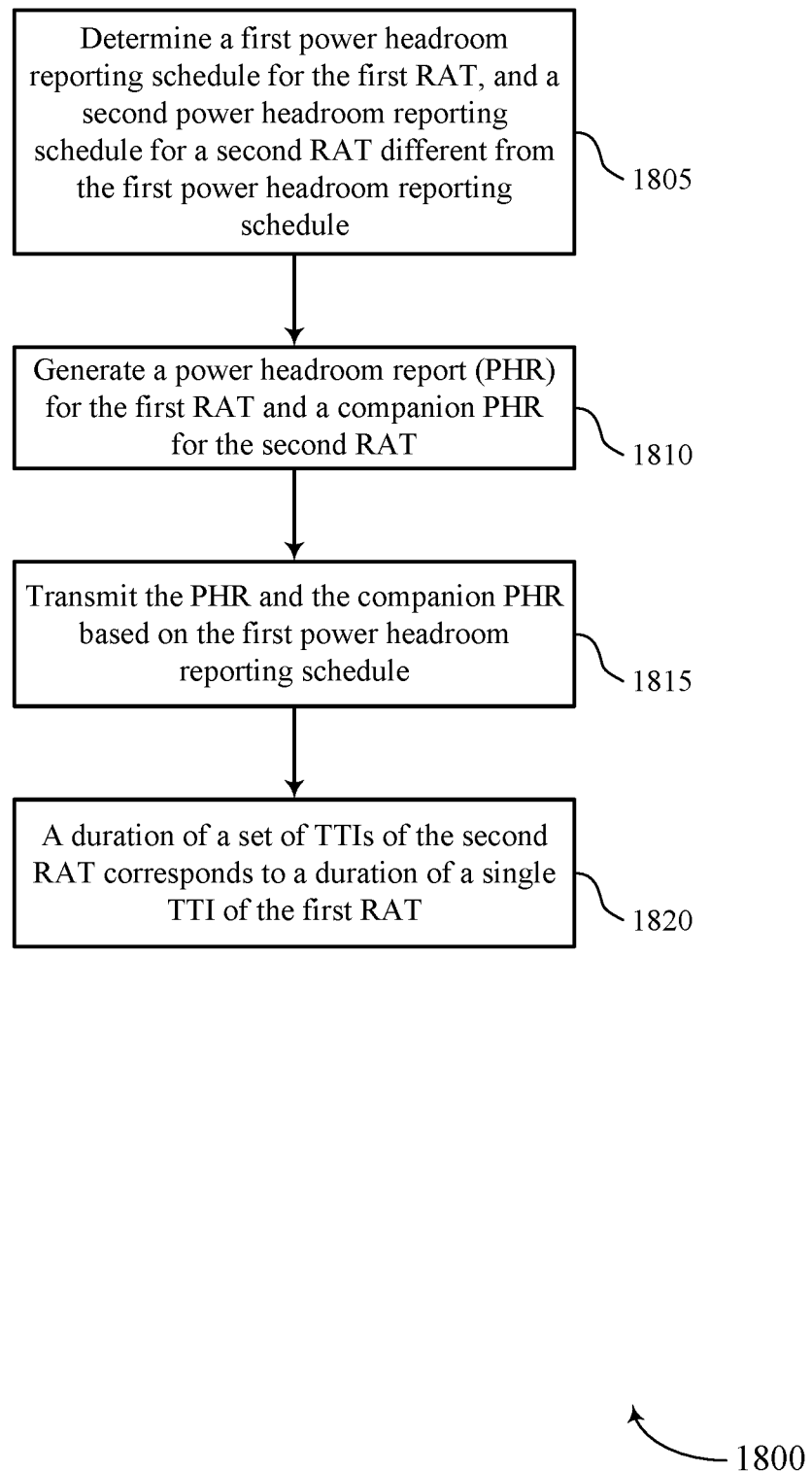

FIG. 18 shows a flowchart illustrating a method 1800 for power headroom report for LTE-NR co-existence in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may determine a first power headroom reporting schedule for the first RAT, and a second power headroom reporting schedule for a second RAT different from the first power headroom reporting schedule. The operations of block 1805 may be performed according to the methods described herein. In certain examples, aspects of the operations of block 1805 may be performed by a scheduling component as described with reference to FIGS. 9 through 12.

At block 1810 the UE 115 may generate a PHR for the first RAT and a companion PHR for the second RAT. The operations of block 1810 may be performed according to the methods described herein. In certain examples, aspects of the operations of block 1810 may be performed by a PHR component as described with reference to FIGS. 9 through 12.

At block 1815 the UE 115 may transmit the PHR and the companion PHR based at least in part on the first power headroom reporting schedule. The operations of block 1815 may be performed according to the methods described herein. In certain examples, aspects of the operations of block 1815 may be performed by a PHR component as described with reference to FIGS. 9 through 12.

At block 1820 the UE 115 may a duration of a plurality of TTIs of the second RAT corresponds to a duration of a single TTI of the first RAT. The operations of block 1820 may be performed according to the methods described herein. In certain examples, aspects of the operations of block 1820 may be performed by a duration component as described with reference to FIGS. 9 through 12. In some cases, a duration of a plurality of TTIs of the second RAT corresponds to a duration of a single TTI of the first RAT.

Figure 19:
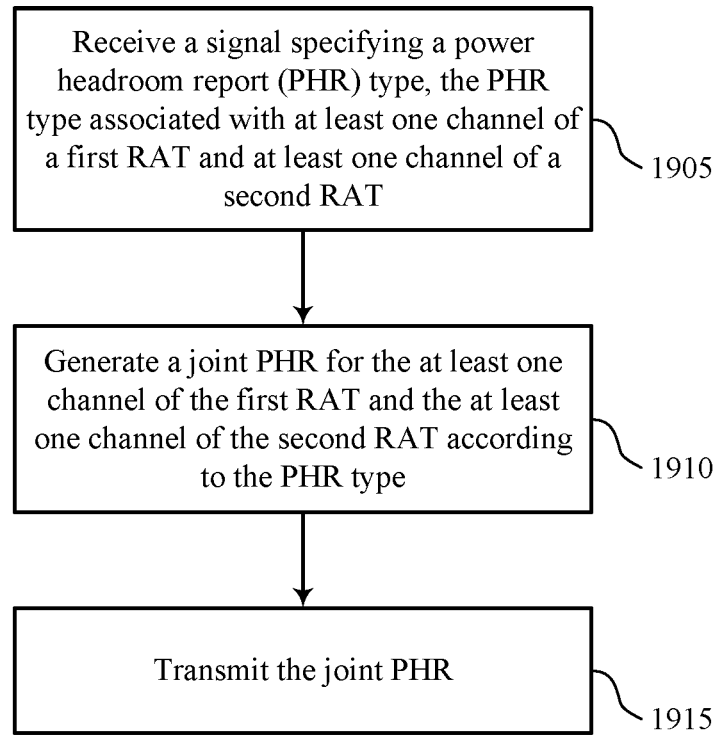

FIG. 19 shows a flowchart illustrating a method 1900 for power headroom report for LTE-NR co-existence in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive a signal specifying a PHR type, the PHR type associated with at least one channel of a first RAT and at least one channel of a second RAT. The operations of block 1905 may be performed according to the methods described herein. In certain examples, aspects of the operations of block 1905 may be performed by a PHR type component as described with reference to FIGS. 9 through 12.

At block 1910 the UE 115 may generate a joint PHR for the at least one channel of the first RAT and the at least one channel of the second RAT according to the PHR type. The operations of block 1910 may be performed according to the methods described herein. In certain examples, aspects of the operations of block 1910 may be performed by a joint PHR component as described with reference to FIGS. 9 through 12.

At block 1915 the UE 115 may transmit the joint PHR. The operations of block 1915 may be performed according to the methods described herein. In certain examples, aspects of the operations of block 1915 may be performed by a joint PHR component as described with reference to FIGS. 9 through 12.

Figure 20:
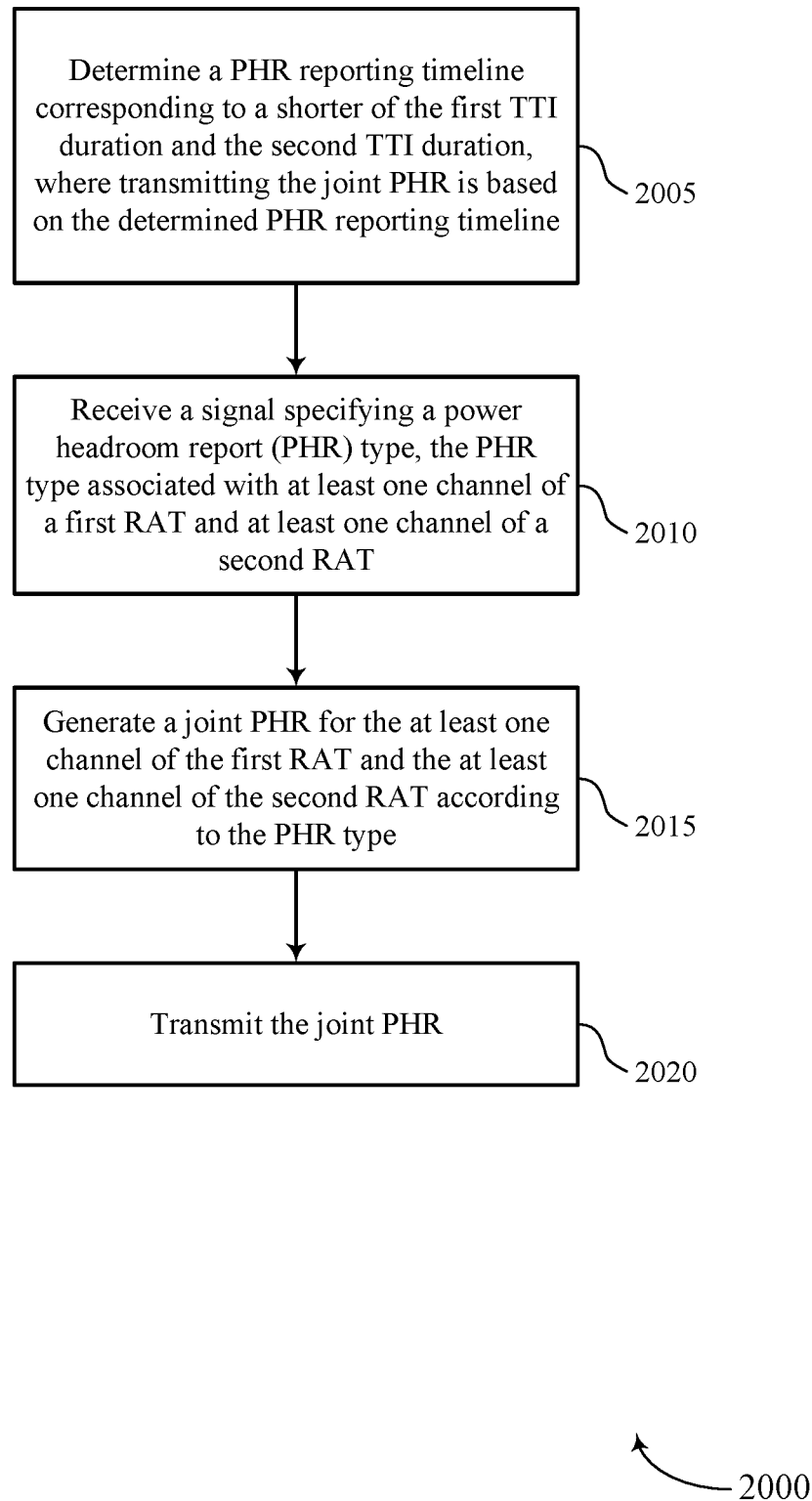

FIG. 20 shows a flowchart illustrating a method 2000 for power headroom report for LTE-NR co-existence in accordance with aspects of the present disclosure. The operations of method 2000 may be implemented by a UE 115 or its components as described herein. For example, the operations of method 2000 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may determine a PHR reporting timeline corresponding to a shorter of the first TTI duration and the second TTI duration, wherein transmitting the joint PHR is based at least in part on the determined PHR reporting timeline. The operations of block 2005 may be performed according to the methods described herein. In certain examples, aspects of the operations of block 2005 may be performed by a scheduling component as described with reference to FIGS. 9 through 12.

At block 2010 the UE 115 may receive a signal specifying a PHR type, the PHR type associated with at least one channel of a first RAT and at least one channel of a second RAT. The operations of block 2010 may be performed according to the methods described herein. In certain examples, aspects of the operations of block 2010 may be performed by a PHR type component as described with reference to FIGS. 9 through 12.

At block 2015 the UE 115 may generate a joint PHR for the at least one channel of the first RAT and the at least one channel of the second RAT according to the PHR type. The operations of block 2015 may be performed according to the methods described herein. In certain examples, aspects of the operations of block 2015 may be performed by a joint PHR component as described with reference to FIGS. 9 through 12.

At block 2020 the UE 115 may transmit the joint PHR. The operations of block 2020 may be performed according to the methods described herein. In certain examples, aspects of the operations of block 2020 may be performed by a joint PHR component as described with reference to FIGS. 9 through 12.

Figure 21:
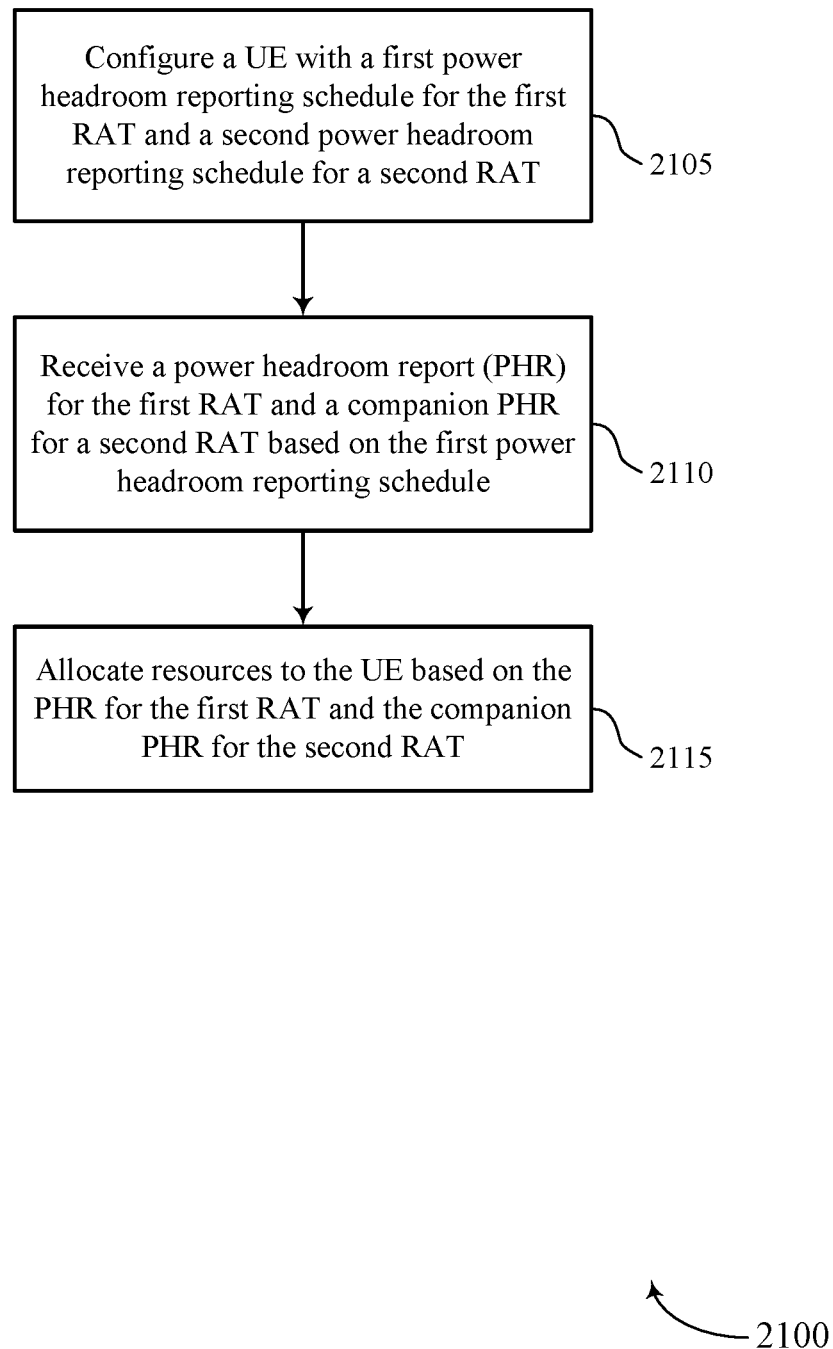

FIG. 21 shows a flowchart illustrating a method 2100 for power headroom report for LTE-NR co-existence in accordance with aspects of the present disclosure. The operations of method 2100 may be implemented by a base station 105 or its components as described herein. For example, the operations of method 2100 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may configure a UE with a first power headroom reporting schedule for the first RAT and a second power headroom reporting schedule for a second RAT. The operations of block 2105 may be performed according to the methods described herein. In certain examples, aspects of the operations of block 2105 may be performed by a scheduling component as described with reference to FIGS. 13 through 16.

At block 2110 the base station 105 may receive a PHR for the first RAT and a companion PHR for a second RAT based at least in part on the first power headroom reporting schedule. The operations of block 2110 may be performed according to the methods described herein. In certain examples, aspects of the operations of block 2110 may be performed by a PHR component as described with reference to FIGS. 13 through 16.

At block 2115 the base station 105 may allocate resources to the UE based at least in part on the PHR for the first RAT and the companion PHR for the second RAT. The operations of block 2115 may be performed according to the methods described herein. In certain examples, aspects of the operations of block 2115 may be performed by a resource allocation component as described with reference to FIGS. 13 through 16.

Figure 22:
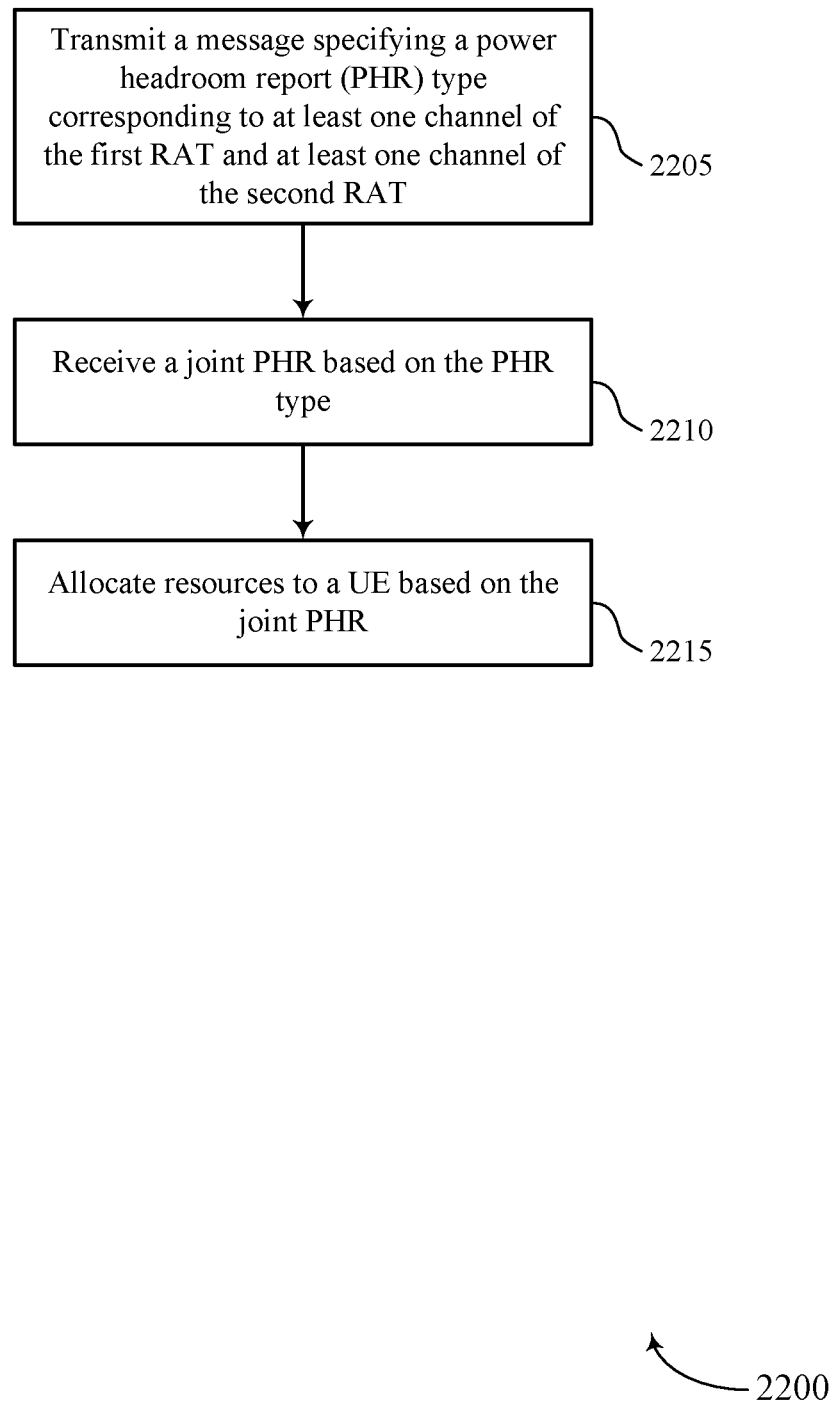

FIG. 22 shows a flowchart illustrating a method 2200 for power headroom report for LTE-NR co-existence in accordance with aspects of the present disclosure. The operations of method 2200 may be implemented by a base station 105 or its components as described herein. For example, the operations of method 2200 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may transmit a message specifying a PHR type corresponding to at least one channel of the first RAT and at least one channel of the second RAT. The operations of block 2205 may be performed according to the methods described herein. In certain examples, aspects of the operations of block 2205 may be performed by a PHR type component as described with reference to FIGS. 13 through 16.

At block 2210 the base station 105 may receive a joint PHR based at least in part on the PHR type. The operations of block 2210 may be performed according to the methods described herein. In certain examples, aspects of the operations of block 2210 may be performed by a joint PHR component as described with reference to FIGS. 13 through 16.

At block 2215 the base station 105 may allocate resources to a UE based at least in part on the joint PHR. The operations of block 2215 may be performed according to the methods described herein. In certain examples, aspects of the operations of block 2215 may be performed by a resource allocation component as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE) in a system that supports a first radio access technology (RAT) corresponding to a first transmission time interval (TTI) duration and a second RAT corresponding to a second TTI duration different than the first TTI duration, comprising:
    receiving a signal specifying a power headroom report (PHR) type, the PHR type associated with at least one channel of the first RAT and at least one channel of the second RAT;
    determining that an uplink transmission is scheduled for the at least one channel of the first RAT at a given first TTI duration and that an uplink transmission is scheduled for the at least one channel of the second RAT at a given second TTI duration, wherein the given first TTI duration and the given second TTI duration overlap;
    generating a joint PHR for the at least one channel of the first RAT and the at least one channel of the second RAT according to the PHR type based on the given first TTI duration and the given second TTI duration; and
    transmitting the joint PHR.

2. The method of claim 1, wherein generating a joint PHR for the at least one channel of the first RAT and the at least one channel of the second RAT according to the PHR type based on the given first TTI duration and the given second TTI duration comprises computing the PHR based on a transmission power of a transmission transmitted during the given first TTI duration and on a transmission power of a transmission transmitted during the second TTI duration.

3. The method of claim 1, further comprising:
    determining a PHR reporting timeline corresponding to a shorter of the first TTI duration and the second TTI duration, wherein transmitting the joint PHR is based at least in part on the determined PHR reporting timeline.

4. The method of claim 1, wherein generating the joint PHR further comprises:
    determining power headroom as a function of a maximum transmission power of the UE and an estimated transmission power, wherein the estimated transmission power is a function of scheduled transmission power in a control channel of the first RAT, or a shortened TTI of the first RAT, or a control channel of the second RAT, or a shared channel of the first RAT, or a shared channel of the second RAT, or any combination thereof.

5. The method of claim 1, wherein:
    the first RAT and the second RAT communicate using different numerology.

6. The method of claim 1, wherein:
    the joint PHR includes a maximum transmission power of the UE.

7. The method of claim 1, wherein:
    the first TTI duration or the second TTI duration corresponds to a duration of a short TTI (sTTI) or a mini-slot.

8. A method for wireless communication by a base station in a system that supports a first radio access technology (RAT) corresponding to a first transmission time interval (TTI) duration and a second RAT corresponding to a second TTI duration that is different than the first TTI duration, comprising:
    transmitting a message specifying a power headroom report (PHR) type corresponding to at least one channel of the first RAT and at least one channel of the second RAT;
    receiving a joint PHR based at least in part on the PHR type, wherein the joint PHR is based on a given first TTI duration during which an uplink transmission is scheduled for the at least one channel of the first RAT and a second TTI duration during which an uplink transmission is scheduled for the at least one channel of the second RAT; and
    allocating resources to a user equipment based at least in part on the joint PHR.

9. The method of claim 8, further comprising:
    transmitting a second message specifying a second PHR type that differs from the PHR type;
    receiving a second joint PHR based at least in part on the second PHR type; and determining whether to adjust the allocated resources based at least in part on the second joint PHR.

* * * * *